United States Patent [19]

Takada

[11] Patent Number: 4,701,032

[45] Date of Patent: Oct. 20, 1987

[54] GRADED REFRACTIVE INDEX LENS SYSTEM

[75] Inventor: Katsuhiro Takada, Tokyo, Japan

[73] Assignee: Olympus Optical Co., Ltd., Tokyo, Japan

[21] Appl. No.: 790,177

[22] Filed: Oct. 22, 1985

[30] Foreign Application Priority Data

| Oct. 25, 1984 | [JP] | Japan | 59-224869 |
| Jan. 16, 1985 | [JP] | Japan | 60-3998 |
| Jan. 16, 1985 | [JP] | Japan | 60-3999 |
| Jan. 16, 1985 | [JP] | Japan | 60-4000 |
| Jan. 16, 1985 | [JP] | Japan | 60-4001 |

[51] Int. Cl.$^4$ .......................... G02B 3/02; G02B 13/18
[52] U.S. Cl. ................................................... 350/413
[58] Field of Search ......................................... 350/413

[56] References Cited

U.S. PATENT DOCUMENTS

| 3,718,383 | 2/1973 | Moore | 350/413 |
| 4,457,590 | 7/1984 | Moore | 350/413 |

FOREIGN PATENT DOCUMENTS

| 0109456 | 8/1979 | Japan | 350/413 |
| 55-6354 | 1/1980 | Japan . | |
| 58-122512 | 7/1983 | Japan . | |
| 59-62815 | 4/1984 | Japan . | |

OTHER PUBLICATIONS

Journal of Optical Society of America, P. J. Sands, Inhomogeneous Lenses, III. Paraxial Optics, vol. 61, No. 7, Jul. 1971, pp. 879–885.

Primary Examiner—John K. Corbin
Assistant Examiner—Rebecca D. Gass
Attorney, Agent, or Firm—Cushman, Darby & Cushman

[57] ABSTRACT

A graded refractive index single lens system comprising at least one surface formed spherically with the radius of curvature being large wherein N.A. is large and various aberrations including off-axial aberrations are well-corrected.

70 Claims, 75 Drawing Figures

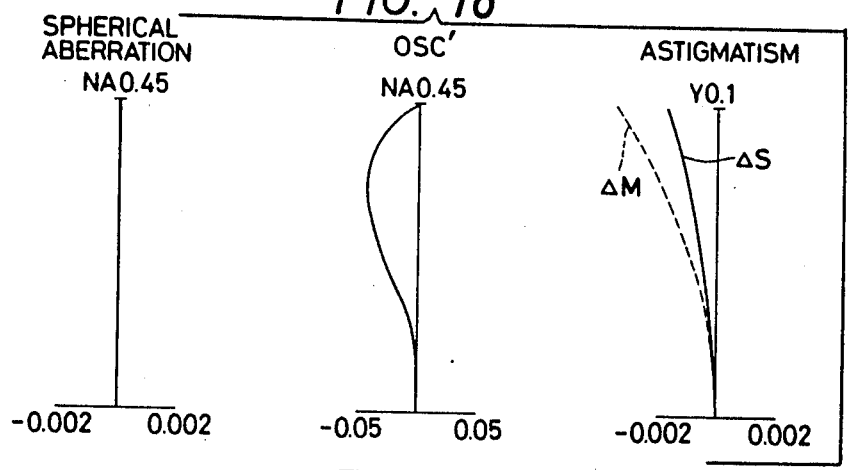
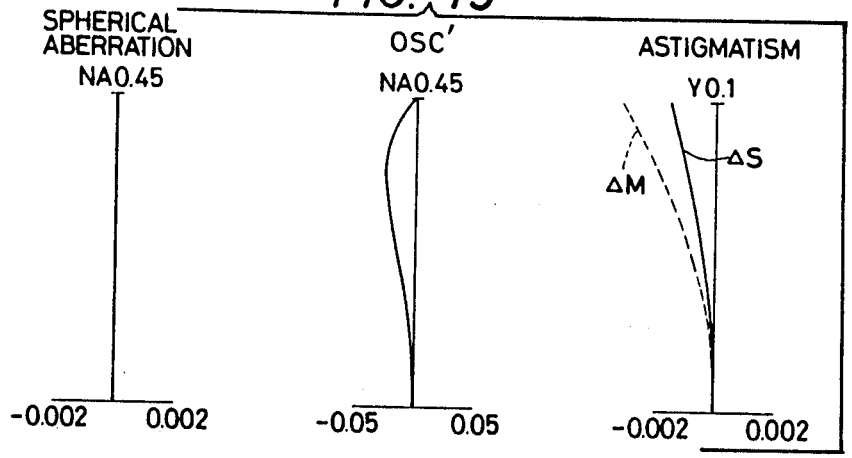
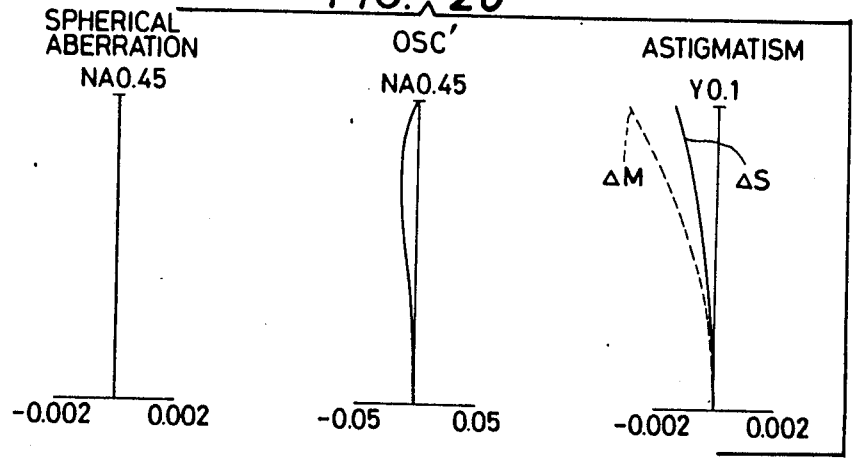

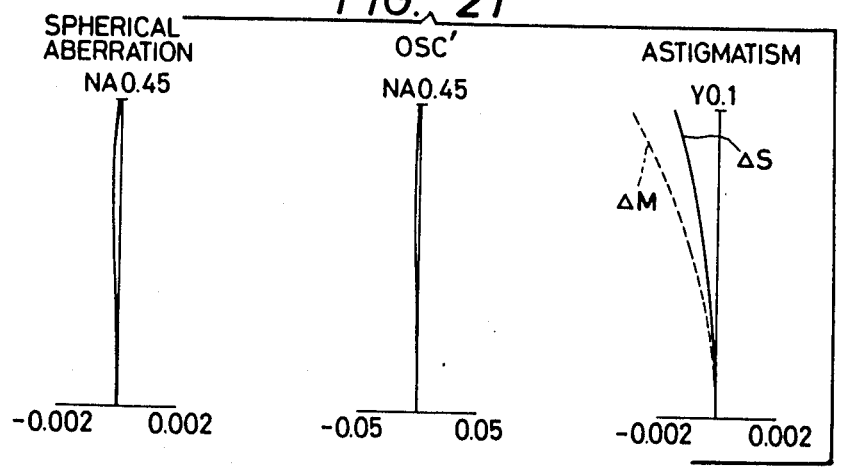
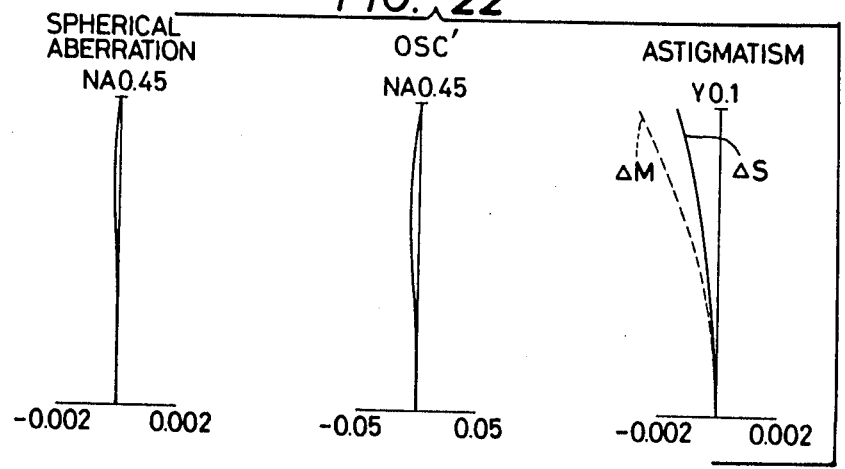
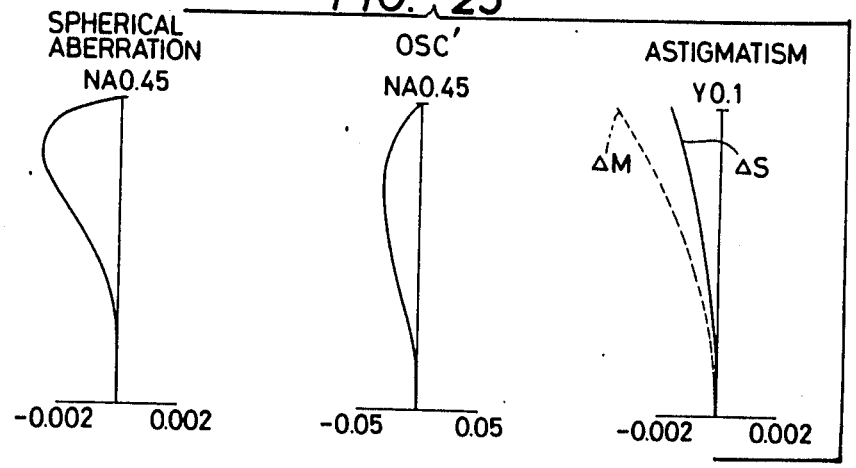

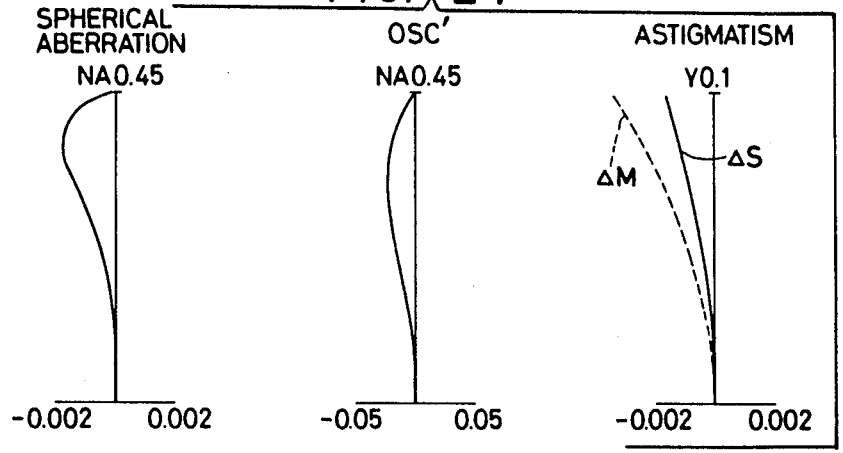
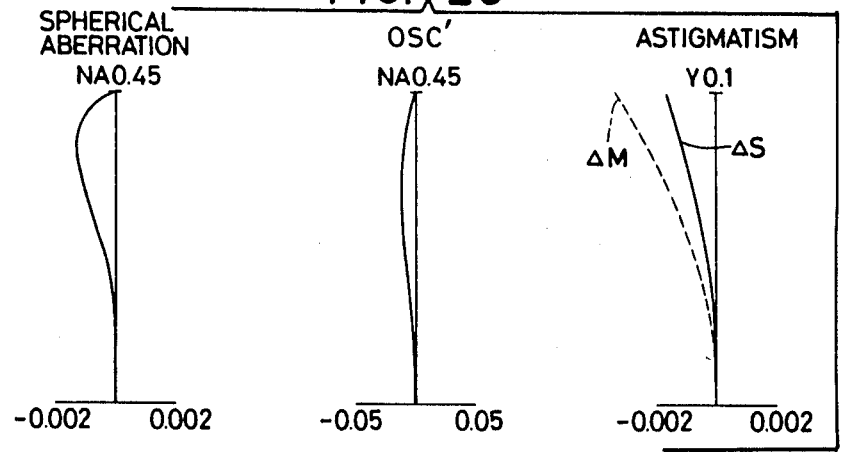
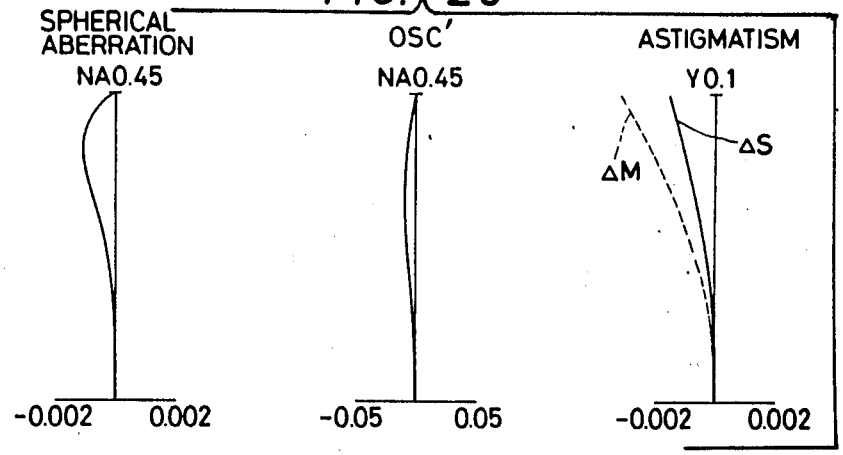

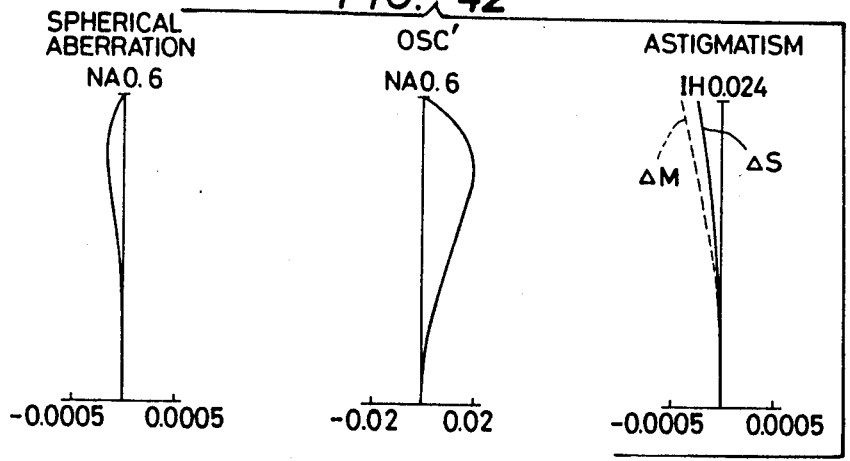
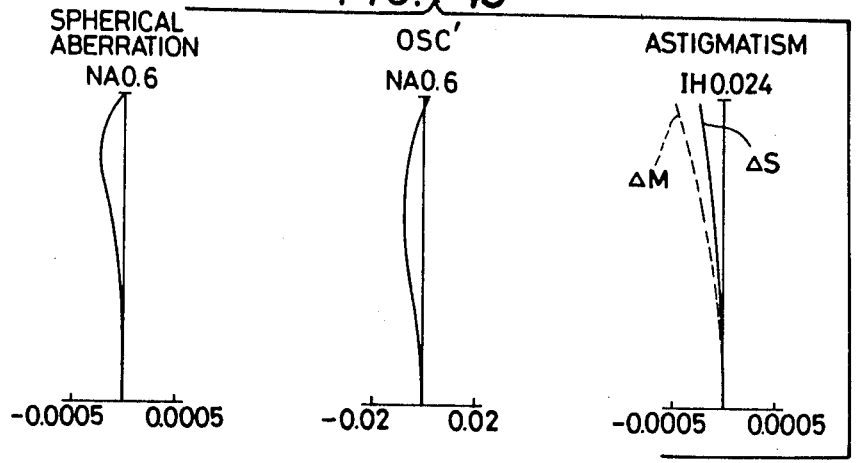
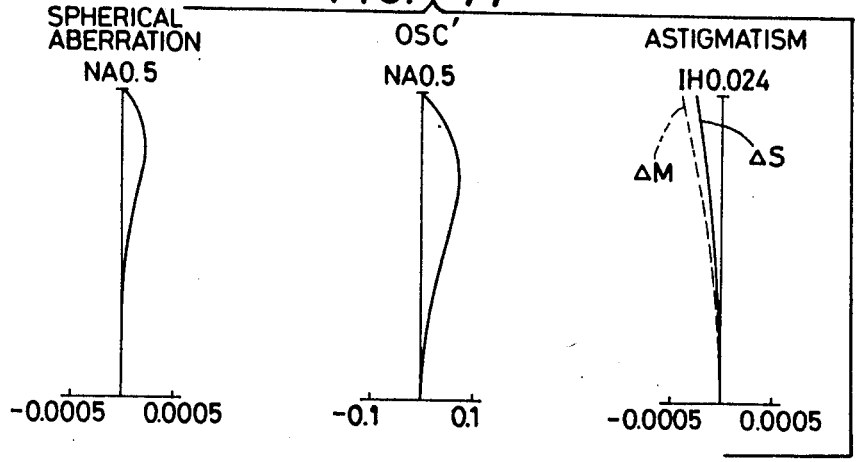

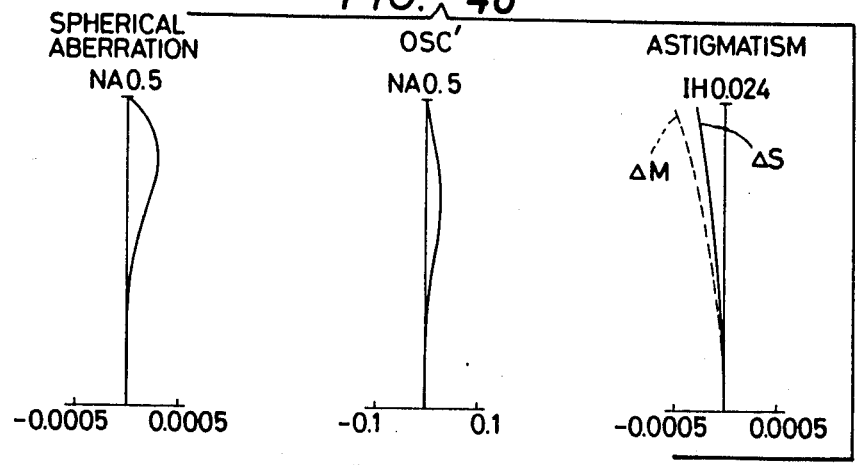
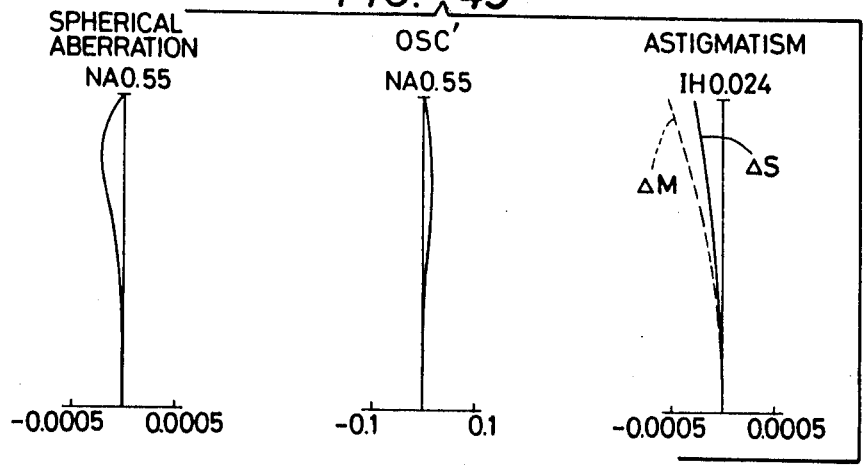
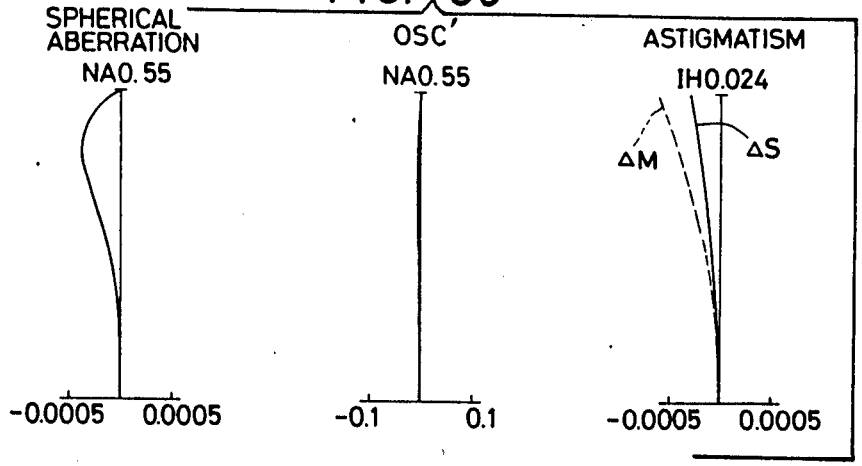

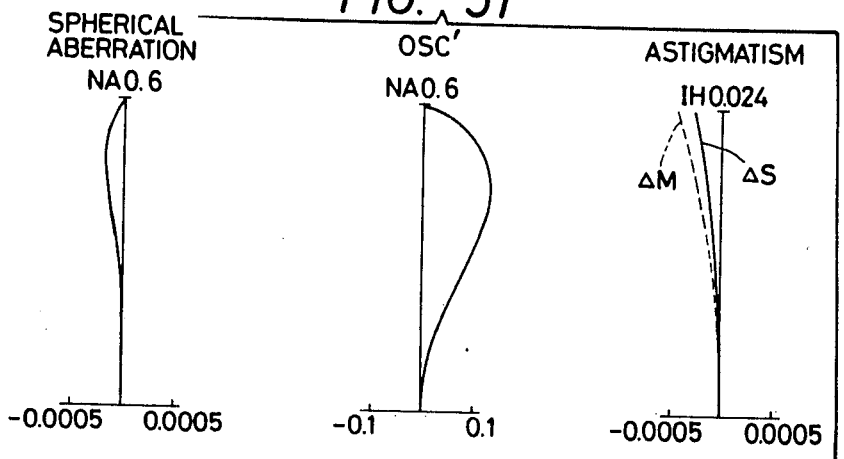
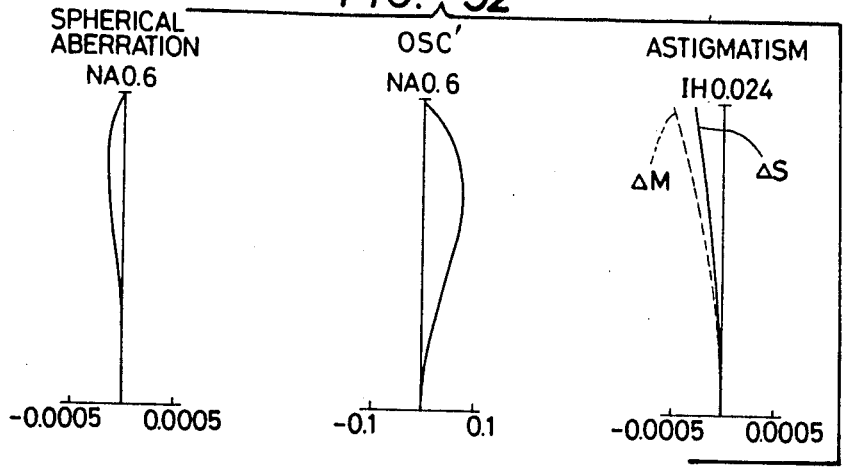
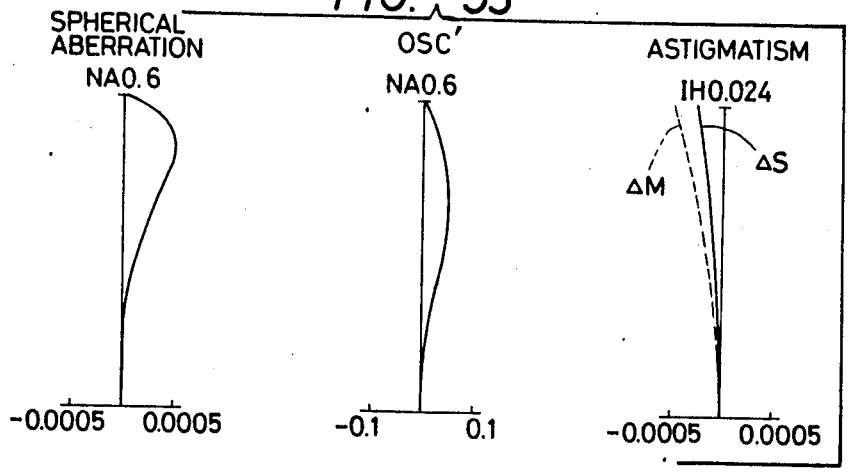

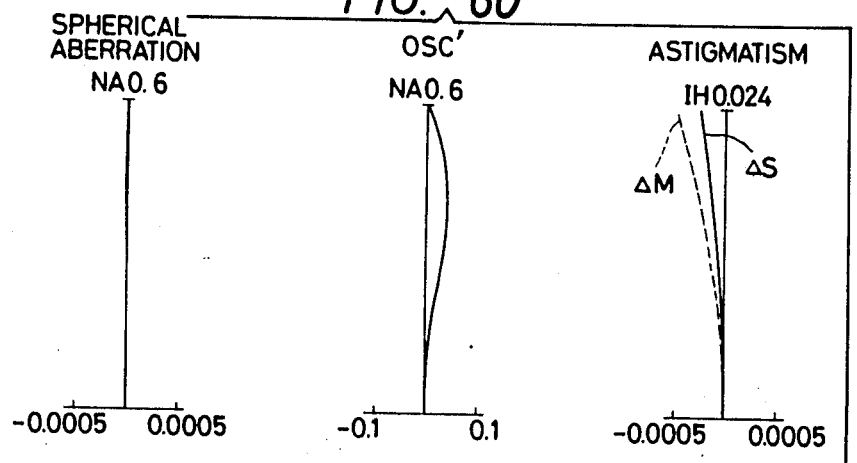
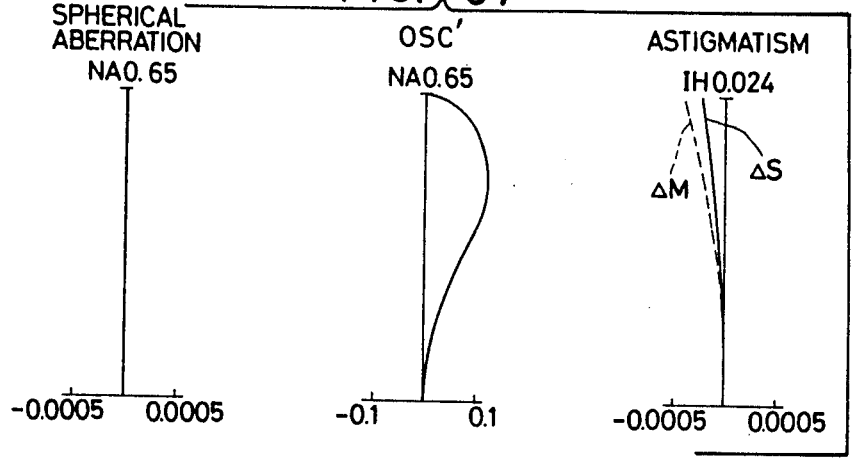
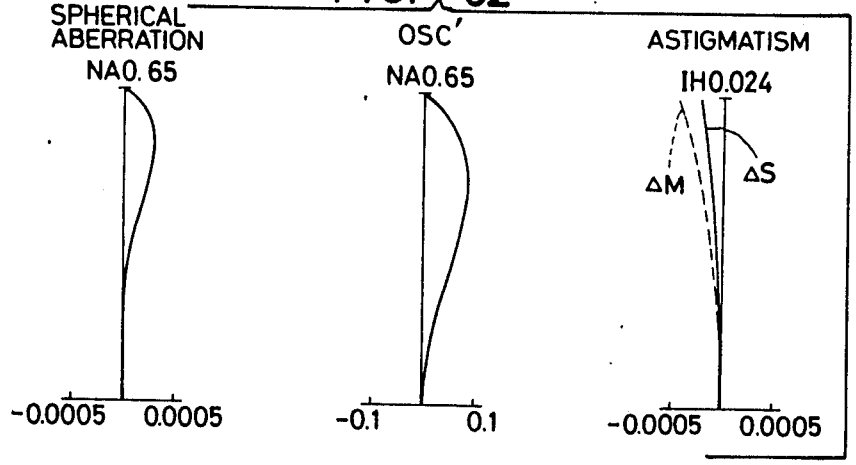

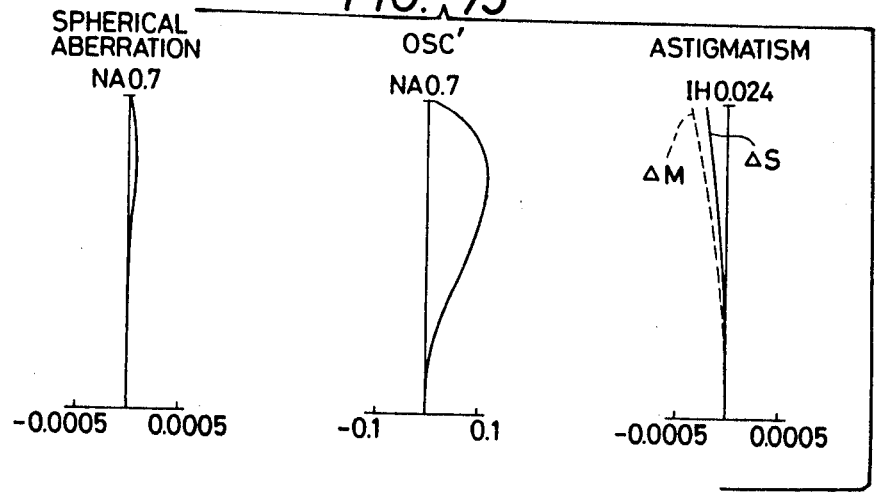

GRADED REFRACTIVE INDEX LENS SYSTEM

BACKGROUND OF THE INVENTION (a) Field of the Invention

The present invention relates to a lens system using inhomogeneous material, especially a graded refractive index (GRIN) single lens system used as an objective lens system for optical video disks, etc.

(b) Description of the Prior Art

Recently there have developed apparatuses which read, by the converging of a laser beam to a microspot, the information which is recorded with high density on recording medium such as optical video disks, digital audio disks, etc.

In such apparatuses, it is necessary for an objective lens system used for the recording and the reproducing of information to be compact and light because the objective lens system is driven directly for the purpose of autofocusing and auto-tracking. It is also necessary for the objective lens system to have a large N.A. in order to obtain a smaller spot size of a laser beam which is converged on a recording medium.

As such an objective lens system, a combination of a plurality of homogeneous spherical lenses or a single homogeneous aspherical lens, especially for the purposes of being compact and light, has hitherto been in use.

Moreover, besides these homogeneous lenses, a GRIN single lens system using inhomogeneous material for economy of manufacture, compactness, and light weight has been known recently.

In the early GRIN lens system, only the correction of spherical aberration was considered.

As is well known, it is necessary for an objective lens system used for optical video disks, etc. to have aberrations well-corrected in the range of diameters of 0.1–0.2 mm on the disk surface and, therefore, not ony spherical aberration but also coma should be well-corrected.

A GRIN single lens system disclosed, for example, in Japanese Published Unexamined Patent Application No. 6354/80 has at least one of the refracting surfaces thereof formed as a spherical surface. In this lens system, spherical aberration is well-corrected, but the correction of other aberrations is not sufficient.

GRIN single lens systems intended to correct off-axial aberrations, especially coma are disclosed in Japanese Published Unexamined Patent Application Nos. 122512/83 and 62815/84. In these lens systems, the refracting surface of the GRIN lens is formed as spherical one, and the radius of curvature of this spherical surface and the higher-order coefficients of the refractive index distibution are arranged ranged so that both spherical aberration and coma can be corrected. However, in the former lens system (Japanese Published Unexamined Patent Application No. 6354/80), it cannot be said that the correction of aberrations thereof is sufficient. The latter lens systems (Japanene Published Unexamined Patent Application Nos. 122512/83 and 62815/84) have defects in that, for example, the shapes of these lenses have such strongly meniscus shapes that the manufacture thereof is difficult.

SUMMARY OF THE INVENTION

It is a primary object of the present invention to provide a graded refractive index (GRIN) single lens system with a comparatively large N.A. comprising at least one surface thereof formed spherically, the radius of curvature of which is large so that the manufacture thereof is easy.

In the GRIN single lens system according to the present invention, the refractive index distribution is cylindrically symmetric to the optical axis and is expressed by the following formula:

$$n^2 = n_0^2[1 - (gr)^2 + h_4(gr)^4 + h_6(gr)^6 + \ldots]$$

where $n_0$ represents the refractive index on the optical axis of the lens, r represents the radial distance from the optical axis, g is the parameter representing the degree of gradient of the refractive index distribution, and, $h_4$ and $h_6$ respectively represent the 4th- and 6th-order coefficients of the refractive index distribution.

In the GRIN lens whose refractive index distribution is expressed by the above mentioned formula, in order to make the refracting power of the entire lens system at a predetermined value and to correct aberrations, both the refracting power of the refracting surface and that of the lens medium are appropriately arranged. The refracting power of the lens medium can be determined precisely from the description in Journal of Optical Society of America Vol. 61, No. 7, pp. 879–885, "Inhomogeneous Lens III, Paraxial Optics". According to this description, when gD is less than $\pi/2$ (D represents the thickness of the lens), the magnitude of the refractive power of the lens medium can be known by the value of gD. The degree of the gradient of the refractive index distribution is expressed by the parameter g. The value of g is also influenced by the shape of the lens, for example, the diameter thereof. In an ordinary homogeneous lens, the lens whose focal length, radii of curvatures, length and diameter are multiplied by a fixed number compared with those of an original lens is optically equivalent to the original lens. In a GRIN lens, only when the parameter g is multiplied by the reciprocal of that fixed number compared with that of an original lens in addition to the values obtained as above, can the lens optically equivalent to the original lens be obtained. Therefore, the gradient of the refractive index distribution can be arranged not only by the shape of the lens but also by the value of $g\phi$ (where $\phi$ represents the diameter of the lens) of gf (where f represents the focal length of the lens).

Thus, in a GRIN lens, when the values of some parameters of D, gD, $g\phi$, gf, etc. are suitably chosen, and when some parameters of them are suitably selected, these selected parameters are correlated with one another and suitable values are fixed, it is possible to obtain the GRIN lens wherein N.A. is large and aberrations are well-corrected though the radius of curvature of the lens surface is kept large.

The sets of parameters to be selected may be as follows:

(a) parameters D, gD, $g\phi$
(b) parameters D, gf
(c) parameters D, gD, gf
(d) parameters D, (g−0.5)D When the set (a) is selected from the above mentioned sets, it is desirable for the parameters of this set to satisfy the following conditions (1), (2), and (3):

$$gD < 0.51 \tag{1}$$

$$0.3 < g\phi < 0.7 \tag{2}$$

$$0.28f < D \tag{3}$$

The conditions (1) and (2) define the refracting power of the lens medium and the degree of the gradient of the refractive index distribution, and are established in order to make the radius of curvature of a refracting surface large when aberrations are to be well-corrected.

If the value of gD becomes large, spherical aberration and coma generated by the ray passing through the lens medium will become large. In order to correct these aberrations, it is necessary to make the refracting surface at the opposite side of the long conjugate point a strong concave surface. If the value of gD under the condition (1) exceeds the limit of this condition, the radius of curvature of this surface will become strong so that the manufacture of the lens will become difficult.

Even if gD is within the limit of the condition (1), in case $g\phi$ exceeds the upper limit of the condition (2), the gradient of the refractive index distribution will become steep and the ray will be curved largely in the lens medium. In this state, it is necessary for the good correction of aberrations to make the refracting surface at the opposite side of the long conjugate point a strong concave surface, which is against the object of the present invention.

The lower limit of the condition (2) and the condition (3) itself are established in order to correct the various aberrations well. If the value of $g\phi$ under the condition (2) exceeds the lower limit of this condition or the condition (3) is not satisfied, it will be impossible to correct both spherical aberration and coma.

When the set (b) of the parameters is selected, it is necessary to satisfy the following conditions (4) and (5):

$$0.96\ f < D < 1.536\ f \qquad (4)$$

$$0.63 < gf \qquad (5)$$

The lower limit of the condition (4) and the condition (5) itself are established in order to correct both astigmatism and sign condition with good balance and, furthermore, keep the sign condition in a good state.

If the value of D under the condition (4) exceeds the lower limit thereof, astigmatism will deteriorate. If the condition (5) is not satisfied, the sign condition will deteriorate.

When these conditions are satisfied, it will be possible to correct the sign condition easily while astigmatism is kept in a good state.

The upper limit of the condition (4) is established in order to keep the minimum necessary working distance provided that the condition (5) is satisifed. In other words, if the value of D under the condition (4) exceeds the upper limit thereof, it will be impossible to keep the necessary working distance.

When the set (c) of the parameters is selected, it is necessary to satisfy the following conditions (6), (7) and (8):

$$D < 1.08\ f \qquad (6)$$

$$gf < 0.604 \qquad (7)$$

$$0.51 < gD \qquad (8)$$

The condition (6) defines the length D of the lens and is established in order to keep the necessary working distance while maintaining balance with astigmatism. If this condition is not satisfied, it will be impossible to keep a sufficient working distance.

The condition (7) is established in order to correct astigmatism. When this condition is not satisfied even if the value of D is chosen to satisfy the condition (6), astigmatism will deteriorate and it will be impossible to make N.A. large.

The upper limit of the refracting power of the lens medium is determined to satisfy the conditions (6) and (7). But in order to correct various aberrations with good balance, it is more desirable to have the refracting power distributed suitably between the power of the refracting surface and that of the lens medium. If the refracting power of the lens medium exceeds a limit value and becomes small, astigmatism will deteriorate remarkably and it will be very hard to correct it under the condition wherein astigmatism is balanced with spherical aberration.

The condition (8) defines the lower limit of the refracting power of the lens medium. If the value of gD under the condition (8) exceeds the lower limit thereof, it will be impossible to make N.A. large.

In the GRIN lens satisfying the conditions (6), (7) and (8), it will be possible to correct spherical aberration and astigmatism with good balance when the radius $R_1$ of curvature of the refracting surface at the long conjugate side and the radius $R_2$ of that at the short conjugate side satisfy the following condition (9) so that the refracting powers of both surfaces are well balanced:

$$2 < |R_2/R_1| \qquad (9)$$

When the 4th-order coefficient $h_4$ of the refractive index distribution satisfy the following condition (10), it will be possible to keep a spherical aberration curve in a good shape and maintain the root mean square of wave aberration at a very small value of $\lambda/40$ near the optical axis.

$$h_4 < 0 \qquad (10)$$

When the set (c) of the parameters, i.e., D, gf, gD is selected, even if the length D of the lens is longer to some extent, it will be possible to form the GRIN lens which also attains the object of the present invention provided that the value of gf is appropriately arranged. In other words, the following condition (11), (12) and (13) should be satisfied.

$$1.152\ f < D < 1.392\ f \qquad (11)$$

$$gf < 0.562 \qquad (12)$$

$$0.51 < gD \qquad (13)$$

The lower limit of the condition (11) and the upper limit of the condition (12) are established in order to correct astigmatism. If these limits are exceeded, it will be impossible to correct astigmatism sufficiently when N.A. is to be large.

The upper limit of the condition (11) is established in order to make the radius of curvature of at least one refracting surface large. If the value of D under the condition (11) exceeds the upper limit thereof, it will be impossible to make the radius of curvature of the refracting surface large.

The condition (13) is established for the same reason as for the establishment of the condition (8).

Finally, when the set (d) of the parameters is selected, it will be necessary to satisfy the following conditions (14) and (15).

$$1.54\ f < D \qquad (14)$$

$$-4 < (g-0.5)D \quad (15)$$

The condition (14) relates to the length of the lens and is correct astigmatism. If this condition is not satisfied, it will be impossible to correct astigmatism when N.A. is enlarged to about 0.7.

The condition (15) relates to the refracting power of the lens medium. As is mentioned above, in a GRIN lens, the refracting power of the entire lens can be divided between the refracting power of the refracting surface and that of the lens medium, the balance of which is important when the various aberrations are to be corrected. For keeping a good balance it is necessary to take the length of the lens itself into account. If this condition (15) is not satisfied, spherical aberration will deteriorate. Depending on the refracting power of the refracting surface, it may be hard to keep a good balance of aberrations and impossible to correct them.

BRIEF DESCRIPTION OF THE DRAWINGS

FIGS. 12 through 75, respectively, show graphs illustrating aberration curves of Embodiment 1 through 64 of the GRIN lens system according to the present invention.

DETAILED DESCRIPTION OF THE PREFERRED EMBODIMENTS

Figure 1:
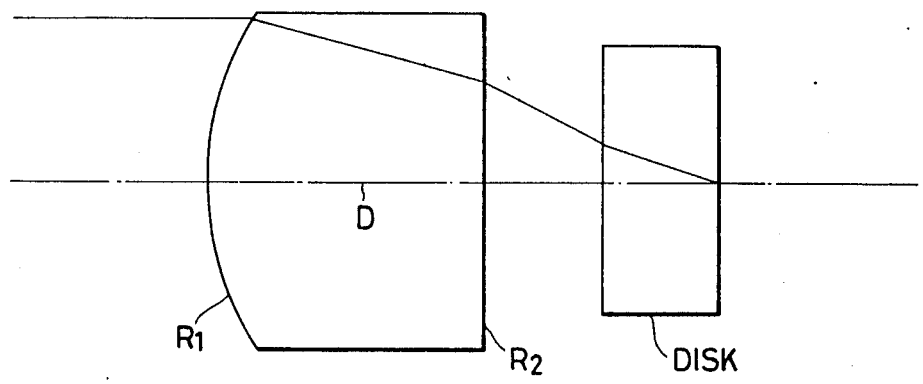
FIG. 1 shows a sectional view of Embodiment 1 of the GRIN single lens system according to the present invention.

Preferred Embodiments of the GRIN lens system according to the present invention as described above are explained below.

Embodiments 1 through 21 according to the present invention shown in the following numerical data have the features in the parameters $gD$, $g\phi$, $D$ defined and satisfy the conditions (1), (2) and (3).

Embodiment 1
$R_1 = 2.847$, $R_2 = \infty$, $D = 2.832$, $n_0 = 1.65$
$g = 0.12$, $h_4 = 2.404$, $h_6 = 47.99$, $\phi = 3.2$
$f = 3.5556$, $NA = 0.45$, $WD = 1.21$, $gD = 0.340$
$g\phi = 0.384$, $D/f = 0.796$ Embodiment 2
$R_1 = 3.009$, $R_2 = -62.404$, $D = 3.333$, $n_0 = 1.65$
$g = 0.12$, $h_4 = 1.716$, $h_6 = 32.20$, $\phi = 3.2$
$f = 3.5556$, $NA = 0.45$, $WD = 0.99$, $gD = 0.400$
$g\phi = 0.384$, $D/f = 0.937$ Embodiment 3
$R_1 = 3.194$, $R_2 = -24.832$, $D = 3.750$, $n_0 = 1.65$
$g = 0.12$, $h_4 = 1.298$, $h_6 = 23.65$, $\phi = 3.2$
$f = 3.5556$, $NA = 0.45$, $WD = 0.84$, $gD = 0.45$
$g\phi = 0.384$, $D/f = 1.055$ Embodiment 4
$R_1 = 3.458$, $R_2 = -12.852$, $D = 4.167$, $n_0 = 1.65$
$g = 0.12$, $h_4 = 1.082$, $h_6 = 18.89$, $\phi = 3.2$
$f = 3.5556$, $NA = 0.45$, $WD = 0.73$, $gD = 0.5$
$g\phi = 0.384$, $D/f = 1.172$ Embodiment 5
$R_1 = 2.649$, $R_2 = 60.550$, $D = 1.333$, $n_0 = 1.65$
$g = 0.15$, $h_4 = -0.597$, $h_6 = -2.040$, $\phi = 3.2$
$f = 3.5556$, $NA = 0.45$, $WD = 2.01$, $gD = 0.2$
$g\phi = 0.48$, $D/f = 0.375$ Embodiment 6
$R_1 = 2.716$, $R_2 = 40.040$, $D = 1.667$, $n_0 = 1.65$
$g = 0.15$, $h_4 = -0.611$, $h_6 = -0.923$, $\phi = 3.2$
$f = 3.5556$, $NA = 0.45$, $WD = 1.82$, $gD = 0.25$
$g\phi = 0.48$, $D/f = 0.469$ Embodiment 7
$R_1 = 2.792$, $R_2 = 30.725$, $D = 2.0$, $n_0 = 1.65$
$g = 0.15$, $h_4 = -0.646$, $h_6 = -0.816$, $\phi = 3.2$
$f = 3.5556$, $NA = 0.45$, $WD = 1.64$, $gD = 0.3$
$g\phi = 0.48$, $D/f = 0.562$ Embodiment 8
$R_1 = 2.877$, $R_2 = 25.630$, $D = 2.333$, $n_0 = 1.65$
$g = 0.15$, $h_4 = -0.691$, $h_6 = -0.993$, $\phi = 3.2$
$f = 3.5556$, $NA = 0.45$, $WD = 1.45$, $gD = 0.35$
$g\phi = 0.48$, $D/f = 0.656$ Embodiment 9
$R_1 = 2.973$, $R_2 = 22.668$, $D = 2.667$, $n_0 = 1.65$
$g = 0.15$, $h_4 = -0.735$, $h_6 = -1.227$, $\phi = 3.2$
$f = 3.5556$, $NA = 0.45$, $WD = 1.28$, $gD = 0.4$
$g\phi = 0.48$, $D/f = 0.750$ Embodiment 10
$R_1 = 3.081$, $R_2 = 21.061$, $D = 3.0$, $n_0 = 1.65$
$g = 0.15$, $h_4 = -0.774$, $h_6 = -1.420$, $\phi = 3.2$
$f = 3.5556$, $NA = 0.45$, $WD = 1.11$, $gD = 0.45$
$g\phi = 0.48$, $D/f = 0.844$ Embodiment 11
$R_1 = 3.206$, $R_2 = 20.562$, $D = 3.333$, $n_0 = 1.65$
$g = 0.15$, $h_4 = -0.802$, $h_6 = -1.526$, $\phi = 3.2$
$f = 3.5556$, $NA = 0.45$, $WD = 0.95$, $gD = 0.5$
$g\phi = 0.48$, $D/f = 0.937$ Embodiment 12
$R_1 = 2.916$, $R_2 = 17.811$, $D = 2.059$, $n_0 = 1.65$
$g = 0.17$, $h_4 = -1.247$, $h_6 = -5.704$, $\phi = 3.2$
$f = 3.5556$, $NA = 0.45$, $WD = 1.59$, $gD = 0.35$
$g\phi = 0.544$, $D/f = 0.579$ Embodiment 13
$R_1 = 3.009$, $R_2 = 14.981$, $D = 2.353$, $n_0 = 1.65$
$g = 0.17$, $h_4 = -1.163$, $h_6 = -4.370$, $\phi = 3.2$
$f = 3.5556$, $NA = 0.45$, $WD = 1.44$, $gD = 0.4$
$g\phi = 0.544$, $D/f = 0.662$ Embodiment 14
$R_1 = 3.110$, $R_2 = 12.932$, $D = 2.647$, $n_0 = 1.65$
$g = 0.17$, $h_4 = -1.099$, $h_6 = -3.524$, $\phi = 3.2$
$f = 3.5556$, $NA = 0.45$, $WD = 1.28$, $gD = 0.45$
$g\phi = 0.544$, $D/f = 0.744$ Embodiment 15
$R_1 = 3.219$, $R_2 = 11.371$, $D = 2.941$, $n_0 = 1.65$
$g = 0.17$, $h_4 = -1.047$, $h_6 = -2.937$, $\phi = 3.2$
$f = 3.5556$, $NA = 0.45$, $WD = 1.12$, $gD = 0.5$
$g\phi = 0.544$, $D/f = 0.827$ Embodiment 16
$R_1 = 3.206$, $R_2 = 9.178$, $D = 2.250$, $n_0 = 1.65$
$g = 0.20$, $h_4 = -1.092$, $h_6 = -2.748$, $\phi = 3.2$ -continued

| | | | |
|---|---|---|---|
| $f = 3.5556$ | $NA = 0.45$ | $WD = 1.48$ | $gD = 0.45$ |
| $g\phi = 0.64$ | $D/f = 0.633$ | | |

Embodiment 17

| | | | |
|---|---|---|---|
| $R_1 = 3.318$ | $R_2 = 7.883$ | $D = 2.5$ | $n_0 = 1.65$ |
| $g = 0.20$ | $h_4 = -0.986$ | $h_6 = -2.099$ | $\phi = 3.2$ |
| $f = 3.5556$ | $NA = 0.45$ | $WD = 1.34$ | $gD = 0.5$ |
| $g\phi = 0.64$ | $D/f = 0.703$ | | |

Embodiment 18

| | | | |
|---|---|---|---|
| $R_1 = 3.148$ | $R_2 = 65.733$ | $D = 3.5$ | $n_0 = 1.7$ |
| $g = 0.12$ | $h_4 = 0.909$ | $h_6 = 19.14$ | $\phi = 3.2$ |
| $f = 3.5556$ | $NA = 0.45$ | $WD = 0.89$ | $gD = 0.42$ |
| $g\phi = 0.384$ | $D/f = 0.984$ | | |

Embodiment 19

| | | | |
|---|---|---|---|
| $R_1 = 3.149$ | $R_2 = 10.286$ | $D = 2.5$ | $n_0 = 1.7$ |
| $g = 0.17$ | $h_4 = -1.169$ | $h_6 = -3.832$ | $\phi = 3.2$ |
| $f = 3.5556$ | $NA = 0.45$ | $WD = 1.34$ | $gD = 0.425$ |
| $g\phi = 0.544$ | $D/f = 0.703$ | | |

Embodiment 20

| | | | |
|---|---|---|---|
| $R_1 = 2.760$ | $R_2 = -14.835$ | $D = 3.0$ | $n_0 = 1.55$ |
| $g = 0.13$ | $h_4 = 1.839$ | $h_6 = 36.50$ | $\phi = 3.2$ |
| $f = 3.5556$ | $NA = 0.45$ | $WD = 1.18$ | $gD = 0.39$ |
| $g\phi = 0.416$ | $D/f = 0.844$ | | |

Embodiment 21

| | | | |
|---|---|---|---|
| $R_1 = 2.512$ | $R_2 = -43.624$ | $D = 1.5$ | $n_0 = 1.55$ |
| $g = 0.16$ | $h_4 = -0.608$ | $h_6 = -2.217$ | $\phi = 3.2$ |
| $f = 3.5556$ | $NA = 0.45$ | $WD = 1.93$ | $gD = 0.24$ |
| $g\phi = 0.512$ | $D/f = 0.422$ | | | where $R_1$, $R_2$ respectively represent the radii of curvatures of the lens surfaces, D represents the length of the lens, $n_0$ represents the refractive index on the optical axis of the lens, the parameter g represents the gradient of the refractive index distribution, $h_4$ and $h_6$ respectively represent the 4th- and 6th-order coefficients of the refractive index distribution, $\phi$ represents the diameter of the lens, f represents the focal length of the lens, NA represents the numerical aperture at the side of the disk, and WD represents the distance between the lens and the disk. Both the coefficient g of the refractive index distribution and the value of refractive index are for the wave length $\lambda = 780$ nm.

Embodiments 1 through 21 according to the present invention respectively satisfy the conditions (1) through (3).

Figure 2:
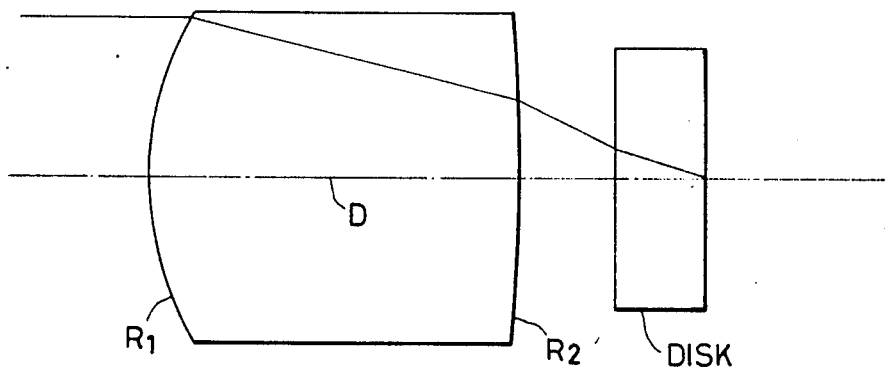
FIG. 2 shows a sectional view of Embodiments 2, 3, 4, 20 and 21 of the GRIN single lens system according to the present invention.
Figure 3:
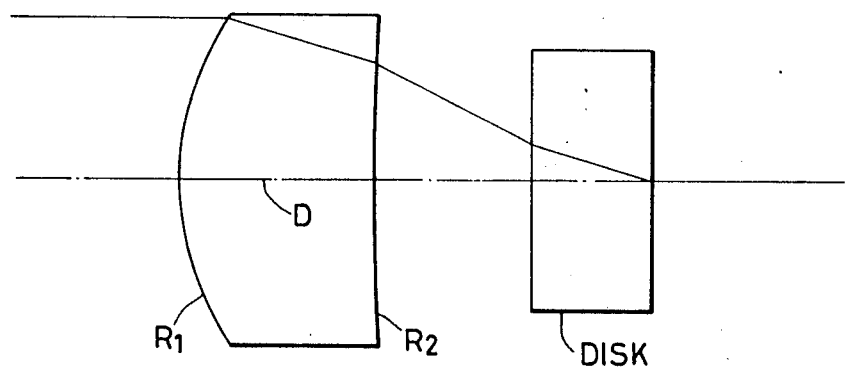
FIG. 3 shows a sectional view of Embodiments 5 through 19 of the GRIN single lens system according to the present invention.

Embodiment 1 according to the present invention is shown in FIG. 1 and is a plano-convex lens having a convex surface at a light source side not shown in this figure (at a long conjugate side). Each of Embodiments 2, 3, 4, 20 and 21 according to the present invention is, as shown in FIG. 2, a biconvex lens having a stronger convex surface at a light source side. Each of Embodiments 5 through 19 is, as shown in FIG. 3, a positive meniscus lens having a convex surface at a light source side.

Embodiments 22 through 32 according to the present invention shown in the following numerical data are the lenses satisfying the conditions (4) and (5).

Embodiment 22

| | | | |
|---|---|---|---|
| $R_1 = 1.234$ | $R_2 = 7.004$ | $D = 1.440$ | $n_0 = 1.50$ |
| $g = 0.646$ | $h_4 = -0.500$ | $h_6 = -0.426$ | $f = 1.0$ |
| $NA = 0.5$ | | | |

Embodiment 23

| | | | |
|---|---|---|---|
| $R_1 = 1.013$ | $R_2 = 4.115$ | $D = 1.140$ | $n_0 = 1.50$ |
| $g = 0.667$ | $h_4 = -0.718$ | $h_6 = -1.144$ | $f = 1.0$ |
| $NA = 0.5$ | | | |

Embodiment 24

| | | | |
|---|---|---|---|
| $R_1 = 1.167$ | $R_2 = 1.230$ | $D = 1.320$ | $n_0 = 1.50$ |
| $g = 0.708$ | $h_4 = -0.530$ | $h_6 = -0.501$ | $f = 1.0$ |
| $NA = 0.5$ | | | |

Embodiment 25

| | | | |
|---|---|---|---|
| $R_1 = 1.039$ | $R_2 = 1.719$ | $D = 1.080$ | $n_0 = 1.50$ |
| $g = 0.729$ | $h_4 = -0.640$ | $h_6 = -0.809$ | $f = 1.0$ |
| $NA = 0.5$ | | | |

Embodiment 26

| | | | |
|---|---|---|---|
| $R_1 = 1.190$ | $R_2 = 0.699$ | $D = 1.200$ | $n_0 = 1.50$ |
| $g = 0.792$ | $h_4 = -0.385$ | $h_6 = -0.221$ | $f = 1.0$ |
| $NA = 0.5$ | | | |

Embodiment 27

| | | | |
|---|---|---|---|
| $R_1 = 1.025$ | $R_2 = 1.462$ | $D = 1.080$ | $n_0 = 1.65$ |
| $g = 0.646$ | $h_4 = -0.847$ | $h_6 = -1.547$ | $f = 1.0$ |
| $NA = 0.5$ | | | |

Embodiment 28

| | | | |
|---|---|---|---|
| $R_1 = 1.244$ | $R_2 = 0.630$ | $D = 1.368$ | $n_0 = 1.65$ |
| $g = 0.688$ | $h_4 = -0.533$ | $h_6 = -0.501$ | $f = 1.0$ |
| $NA = 0.5$ | | | |

Embodiment 29

| | | | |
|---|---|---|---|
| $R_1 = 1.117$ | $R_2 = 0.874$ | $D = 1.140$ | $n_0 = 1.65$ |
| $g = 0.708$ | $h_4 = -0.628$ | $h_6 = -0.719$ | $f = 1.0$ |
| $NA = 0.5$ | | | |

Embodiment 30

| | | | |
|---|---|---|---|
| $R_1 = 1.103$ | $R_2 = 0.902$ | $D = 1.020$ | $n_0 = 1.65$ |
| $g = 0.750$ | $h_4 = -0.570$ | $h_6 = -0.568$ | $f = 1.0$ |
| $NA = 0.5$ | | | |

Embodiment 31

| | | | |
|---|---|---|---|
| $R_1 = 1.231$ | $R_2 = 2.313$ | $D = 1.440$ | $n_0 = 1.50$ |
| $g = 0.667$ | $h_4 = -0.510$ | $h_6 = -0.489$ | $f = 1.0$ |
| $NA = 0.6$ | | | |

Embodiment 32

| | | | |
|---|---|---|---|
| $R_1 = 1.213$ | $R_2 = 1.065$ | $D = 1.380$ | $n_0 = 1.50$ |
| $g = 0.708$ | $h_4 = -0.488$ | $h_6 = -0.432$ | $f = 1.0$ |
| $NA = 0.6$ | | | | where $R_1$, $R_2$ respectively represent the radii of curvatures of the lens surfaces, D represents the length of the lens, $n_0$ represents the refractive index on the optical axis of the lens, the parameter g represents the gradient of the refractive index distribution, $h_4$ and $h_6$ respectively represent the 4th- and 6th-order coefficients of the refractive index distribution, f represents the focal length of the lens, and NA represents the numerical aperture at the side of the disk. Both the coefficient g of the refractive index distribution and the value of refractive index are for the wave length $\lambda = 780$ nm.

Figure 4:
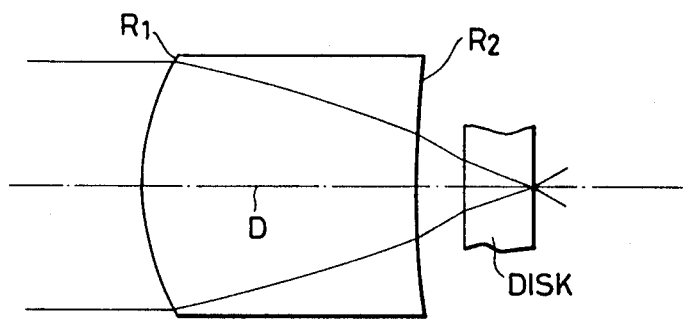
FIG. 4 shows a sectional view of Embodiments 22, 23, 24, 25, 27 and 31 of the GRIN single lens system according to the present invention.
Figure 5:
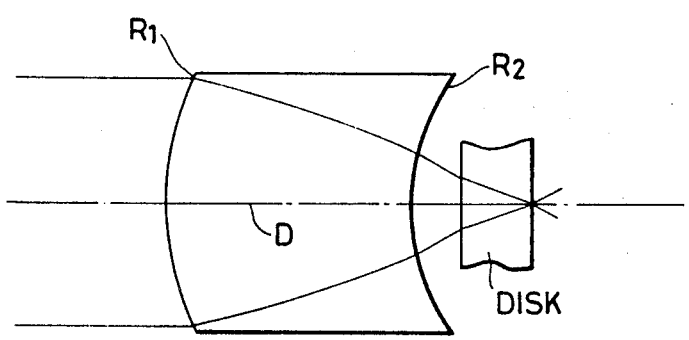
FIG. 5 shows a sectional view of Embodiments 26, 28, 29, 30 and 32 of the GRIN single lens system according to the present invention.

Among them, each of Embodiments 22 through 25, 27 and 31 according to the present invention is a positive meniscus lens as shown in FIG. 4. Each of Embodiments 26, 28 through 30 and 32 according to the present invention is a negative meniscus lens as shown in FIG. 5.

Embodiments 33 through 42 according to the present invention shown in the following numerical data are the lenses satisfying the conditions (6) through (8), and also satisfying the conditions (9) and (10).

Embodiment 33

| | | | |
|---|---|---|---|
| $R_1 = 0.866$ | $R_2 = -4.095$ | $D = 1.02$ | $n_0 = 1.5$ |
| $g = 0.563$ | $h_4 = -0.468$ | $h_6 = 0.822$ | $f = 1.0$ |
| $NA = 0.5$ | $WD = 0.283$ | | |

Embodiment 34

| | | | |
|---|---|---|---|
| $R_1 = 0.815$ | $R_2 = -9.840$ | $D = 0.876$ | $n_0 = 1.5$ |
| $g = 0.592$ | $h_4 = -0.704$ | $h_6 = -1.402$ | $f = 1.0$ |
| $NA = 0.5$ | $WD = 0.340$ | | |

Embodiment 35

| | | | |
|---|---|---|---|
| $R_1 = 0.903$ | $R_2 = 5.311$ | $D = 1.010$ | $n_0 = 1.65$ |
| $g = 0.521$ | $h_4 = -0.699$ | $h_6 = -0.666$ | $f = 1.0$ |
| $NA = 0.5$ | $WD = 0.259$ | | |

Embodiment 36

| | | | |
|---|---|---|---|
| $R_1 = 0.966$ | $R_2 = 2.452$ | $D = 1.060$ | $n_0 = 1.65$ |
| $g = 0.585$ | $h_4 = -0.936$ | $h_6 = -2.223$ | $f = 1.0$ |
| $NA = 0.5$ | $WD = 0.223$ | | |

Embodiment 37

| | | |
|---|---|---|
| $R_1 = 0.905$ | $R_2 = 20.534$ | $D = 1.070$ | $n_0 = 1.65$ |

-continued

```
g = 0.479      h4 = −0.210    h6 = 4.469     f = 1.0
NA = 0.5       WD = 0.240
Embodiment 38
R1 = 0.932     R2 = 3.942     D = 1.050      n0 = 1.65
g = 0.542      h4 = −0.846    h6 = −1.904    f = 1.0
NA = 0.55      WD = 0.237
Embodiment 39
R1 = 0.891     R2 = 3.727     D = 0.924      n0 = 1.65
g = 0.554      h4 = −0.886    h6 = −2.415    f = 1.0
NA = 0.55      WD = 0.295
Embodiment 40
R1 = 0.871     R2 = −6.682    D = 1.020      n0 = 1.5
g = 0.583      h4 = −0.657    h6 = −0.832    f = 1.0
NA = 0.6       WD = 0.275
Embodiment 41
R1 = 0.816     R2 = −8.201    D = 0.900      n0 = 1.5
g = 0.583      h4 = −0.649    h6 = −0.860    f = 1.0
NA = 0.6       WD = 0.329
Embodiment 42
R1 = 0.915     R2 = 7.404     D = 1.070      n0 = 1.65
g = 0.504      h4 = −0.579    h6 = 0.942     f = 1.0
NA = 0.6       WD = 0.234
``` where $R_1$, $R_2$ respectively represent the radii of curvatures of the lens surfaces, D represents the length of the lens, $n_0$ represents the refractive index on the optical axis of the lens, the parameter g represents the gradient of the refractive index distribution, $h_4$ and $h_6$ respectively represent the 4th- and 6th-order coefficients of the refractive index distribution, f represents the focal length of the lens, NA represents the numerical aperture at the side of the disk, and WD represents the distance between the lens and the disk. Both the coefficient g of the refractive index distribution and the value of refractive index are for the wave length $\lambda = 780$ nm.

Figure 6:
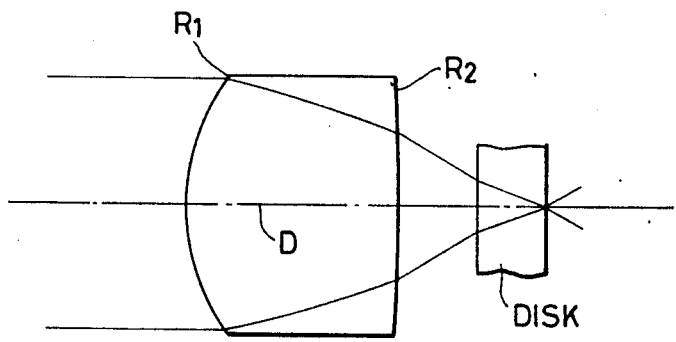
FIG. 6 shows a sectional view of Embodiments 33, 34, 40 and 41 of the GRIN single lens system according to the present invention.
Figure 7:
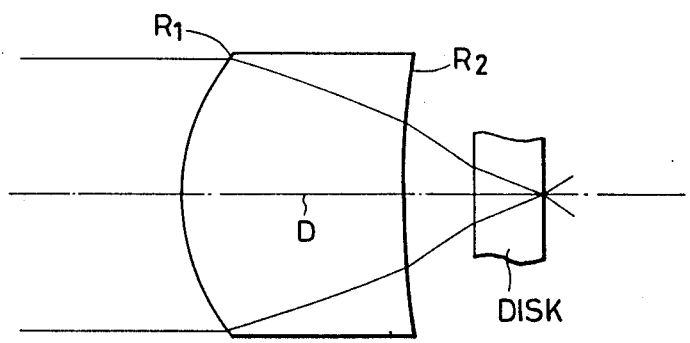
FIG. 7 shows a sectional view of Embodiments 35, 36, 37, 38, 39 and 42 of the GRIN single lens system according to the present invention.

Among them, each of Embodiments 33, 34, 40 and 41 according to the present invention is a biconvex lens as shown in FIG. 6, and each of Embodiments 35 through 39 and 42 is a positive meniscus lens as shown in FIG. 7.

Each of Embodiments 43 through 51 according to the present invention shown in the following numerical data are the lenses satisfying the conditions (11) through (13).

```
Embodiment 43
R1 = 1.075     R2 = 16.903    D = 1.320      n0 = 1.65
g = 0.521      h4 = −0.693    h6 = −0.677    f = 1.0
NA = 0.5
Embodiment 44
R1 = 1.069     R2 = −15.880   D = 1.368      n0 = 1.80
g = 0.375      h4 = 1.058     h6 = 21.635    f = 1.0
NA = 0.5
Embodiment 45
R1 = 1.035     R2 = 2.0750    D = 1.248      n0 = 1.80
g = 0.479      h4 = −0.954    h6 = −2.156    f = 1.0
NA = 0.5
Embodiment 46
R1 = 1.022     R2 = 115.424   D = 1.272      n0 = 1.65
g = 0.500      h4 = −0.602    h6 = 0.441     f = 1.0
NA = 0.6
Embodiment 47
R1 = 1.002     R2 = 4.042     D = 1.200      n0 = 1.65
g = 0.542      h4 = −0.844    h6 = −1.800    f = 1.0
NA = 0.6
Embodiment 48
R1 = 1.039     R2 = 5.178     D = 1.320      n0 = 1.80
g = 0.417      h4 = −0.296    h6 = 5.302     f = 1.0
NA = 0.6
Embodiment 49
R1 = 1.059     R2 = 2.671     D = 1.320      n0 = 1.80
g = 0.458      h4 = −0.854    h6 = −1.367    f = 1.0
NA = 0.6
```

-continued

```
Embodiment 50
R1 = 1.060     R2 = 10.703    D = 1.320      n0 = 1.65
g = 0.521      h4 = −0.741    h6 = −0.911    f = 1.0
NA = 0.65
Embodiment 51
R1 = 1.074     R2 = 3.970     D = 1.368      n0 = 1.80
g = 0.438      h4 = −0.682    h6 = −0.661    f = 1.0
NA = 0.65
``` where $R_1$, $R_2$ respectively represent the radii of curvatures of the lens surfaces, D represents the length of the lens, $n_0$ represents the refractive index on the optical axis of the lens, the parameter g represents the gradient of the refractive index distribution, $h_4$ and $h_6$ respectively represent the 4th- and 6th-order coefficients of the refractive index distribution, f represents the focal length of the lens, and NA represents the numerical aperture at the side of the disk. Both the coefficient g of the refractive index distribution and the value of refractive index are for the wave length $\lambda = 780$ nm.

Figure 8:
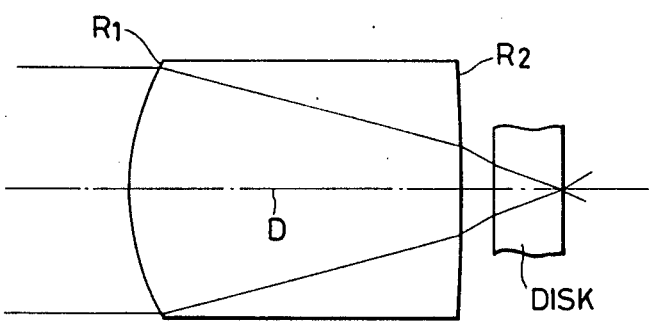
FIG. 8 shows a sectional view of Embodiment 44 of the GRIN single lens system according to the present invention.
Figure 9:
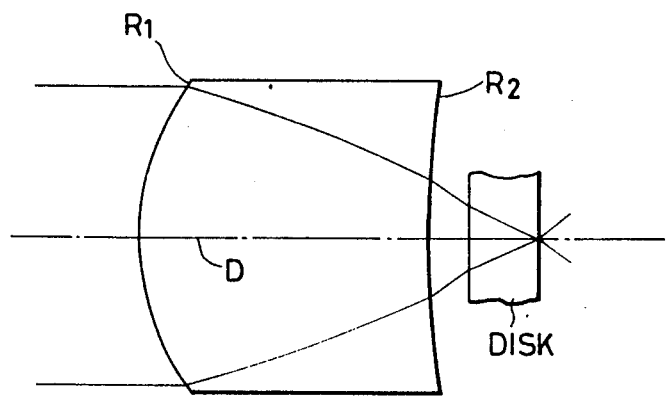
FIG. 9 shows a sectional view of Embodiments 43, 45, 46, 47, 48, 49, 50 and 51 of the GRIN single lens system according to the present invention.

Among them, each of Embodiments 43, 45 through 51 according to the present invention is a positive meniscus lens as shown in FIG. 9, and Embodiment 44 according to the present invention is a biconvex lens as shown in FIG. 8.

Embodiments 52 through 64 according to the present invention shown in the following the numerical data are the lenses satisfying the conditions (14) and (15).

```
Embodiment 52
R1 = 1.697     R2 = −1.356    D = 1.56       n0 = 1.5
g = 0.583      h4 = 0.208     h6 = 1.640     f = 1.0
NA = 0.5
Embodiment 53
R1 = 1.830     R2 = −1.518    D = 1.68       n0 = 1.65
g = 0.500      h4 = 0.530     h6 = 3.966     f = 1.0
NA = 0.5
Embodiment 54
R1 = 2.195     R2 = −1.807    D = 1.92       n0 = 1.65
g = 0.542      h4 = 0.120     h6 = 0.561     f = 1.0
NA = 0.5
Embodiment 55
R1 = 1.332     R2 = −2.166    D = 1.56       n0 = 1.8
g = 0.375      h4 = 1.755     h6 = 26.713    f = 1.0
NA = 0.5
Embodiment 56
R1 = 1.657     R2 = −3.000    D = 1.80       n0 = 1.8
g = 0.458      h4 = −0.103    h6 = 1.743     f = 1.0
NA = 0.5
Embodiment 57
R1 = 1.355     R2 = 1.906     D = 1.56       n0 = 1.5
g = 0.667      h4 = −0.415    h6 = −0.316    f = 1.0
NA = 0.6
Embodiment 58
R1 = 1.500     R2 = −4.096    D = 1.62       n0 = 1.5
g = 0.625      h4 = −0.268    h6 = 0.024     f = 1.0
NA = 0.6
Embodiment 59
R1 = 1.303     R2 = −374.044  D = 1.56       n0 = 1.65
g = 0.542      h4 = −0.570    h6 = −0.430    f = 1.0
NA = 0.6
Embodiment 60
R1 = 1.771     R2 = −2.650    D = 1.80       n0 = 1.65
g = 0.542      h4 = −0.130    h6 = 0.446     f = 1.0
NA = 0.6
Embodiment 61
R1 = 1.389     R2 = 2.792     D = 1.68       n0 = 1.8
g = 0.500      h4 = −0.747    h6 = −1.277    f = 1.0
NA = 0.6
Embodiment 62
R1 = 1.322     R2 = −7.400    D = 1.62       n0 = 1.8
g = 0.438      h4 = −0.410    h6 = 1.969     f = 1.0
```

-continued

NA = 0.6
Embodiment 63
R₁ = 1.289   R₂ = 47.625   D = 1.56    n₀ = 1.65
g = 0.542    h₄ = −0.601   h₆ = −0.530  f = 1.0
NA = 0.7
Embodiment 64
R₁ = 1.233   R₂ = 6.217    D = 1.56    n₀ = 1.8
g = 0.458    h₄ = −0.791   h₆ = −0.991  f = 1.0
NA = 0.7 where $R_1$, $R_2$ respectively represent the radii of curvatures of the lens surfaces, D represents the length of the lens, $n_0$ represents the refractive index on the optical axis of the lens, the parameter g represents the gradient of the refractive index distribution, $h_4$ and $h_6$ respectively represent the 4th- and 6th-order coefficients of the refractive index distribution, f represents the focal length of the lens, and NA represents the numerical aperture at the side of the disk. Both the coefficient g of the refractive index distribution and the value of refractive index are for the wave length $\lambda = 780$ nm.

Figure 10:
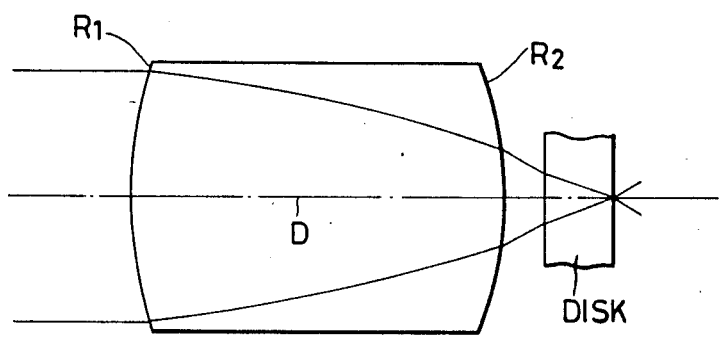
FIG. 10 shows a sectional view of Embodiments 52, 53, 54, 55, 56, 58, 59, 60 and 62 of the GRIN single lens system according to the present invention.
Figure 11:
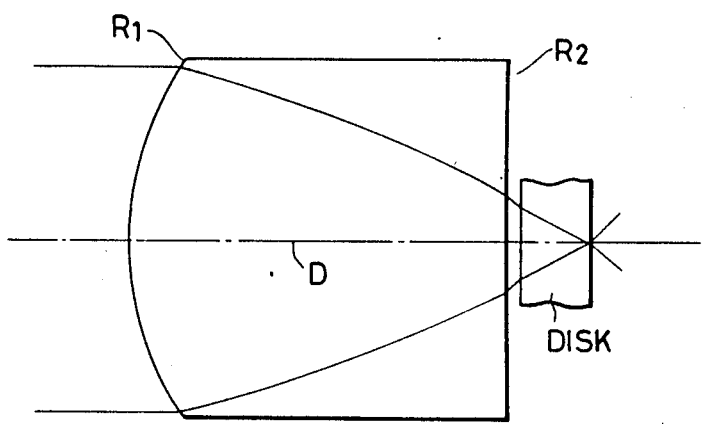
FIG. 11 shows a sectional view of Embodiments 57, 61, 63 and 64 of the GRIN single lens system according to the present invention.
Figure 12:
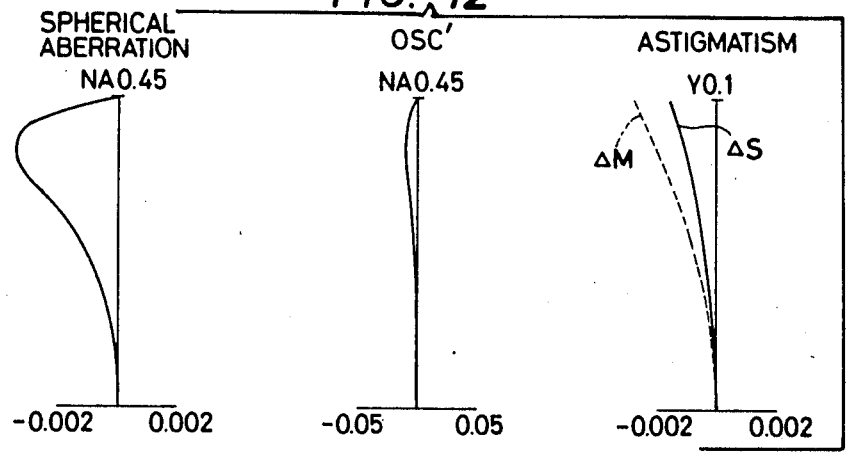
Figure 13:
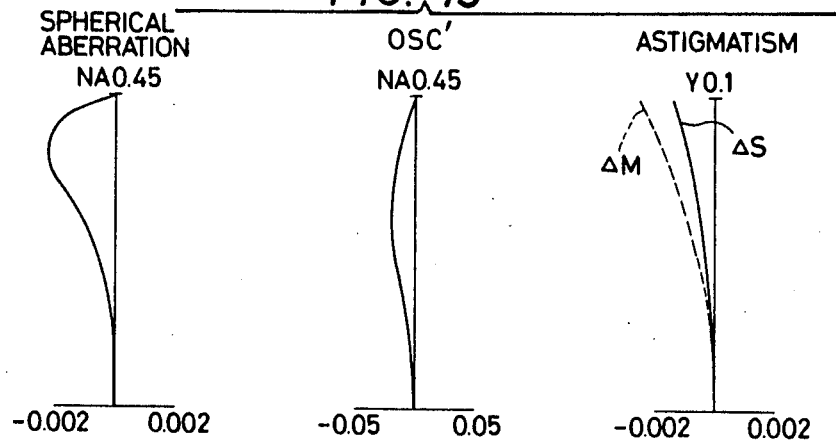
Figure 14:
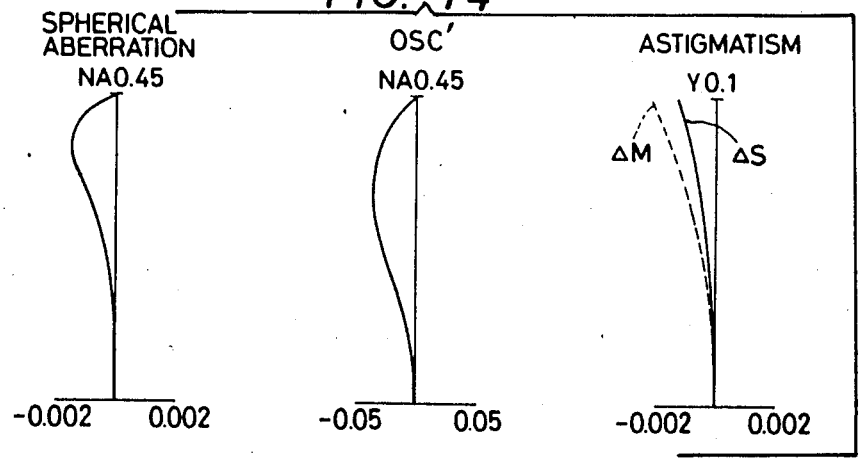
Figure 15:
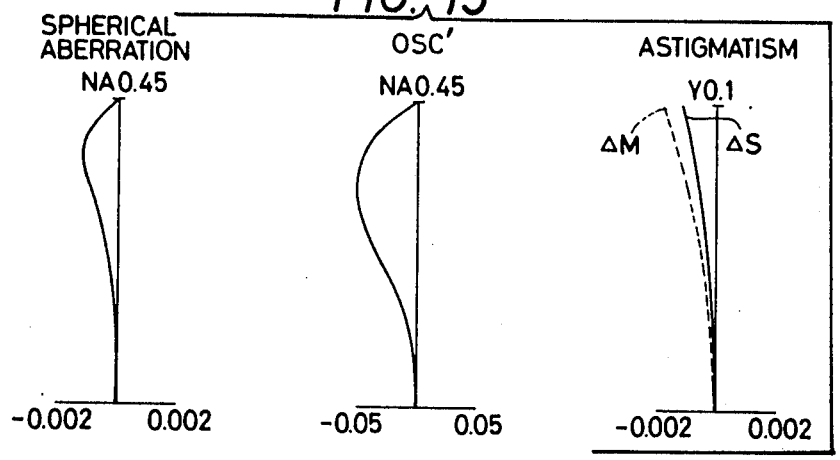
Figure 16:
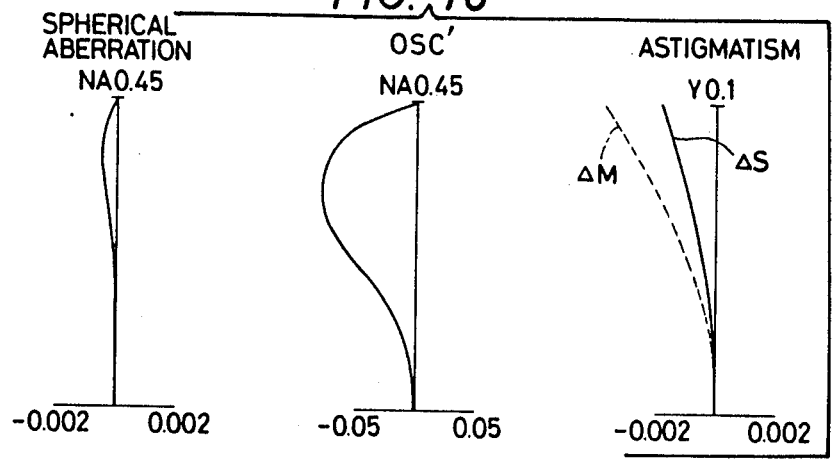
Figure 17:
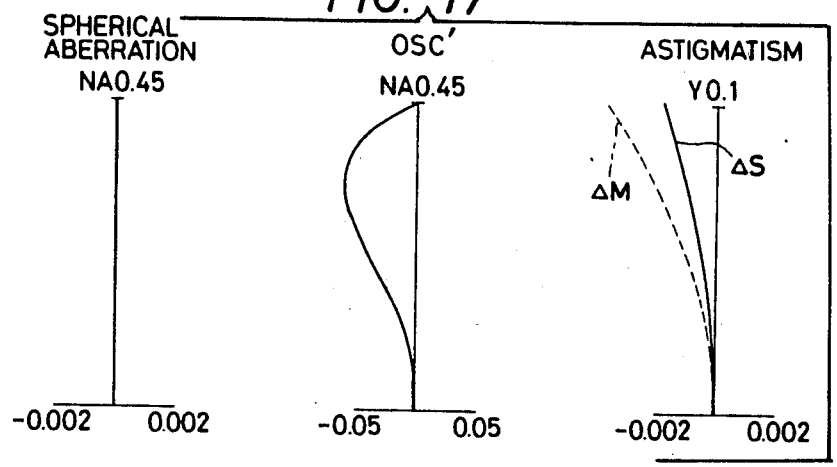
Figure 27:
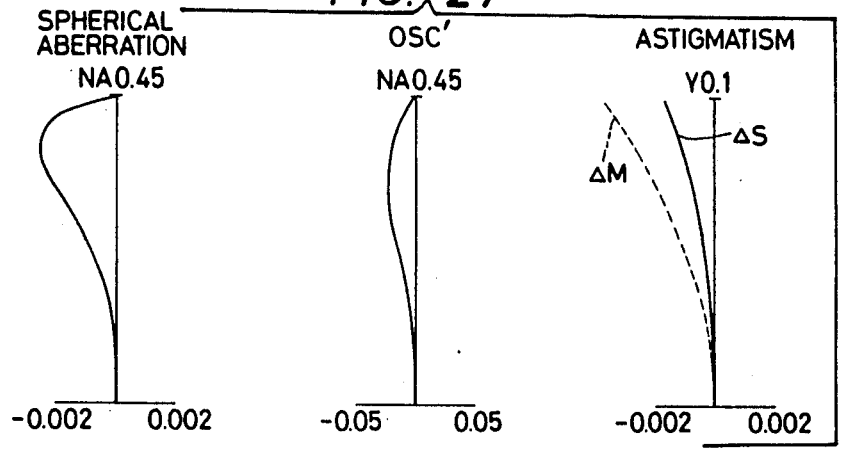
Figure 28:
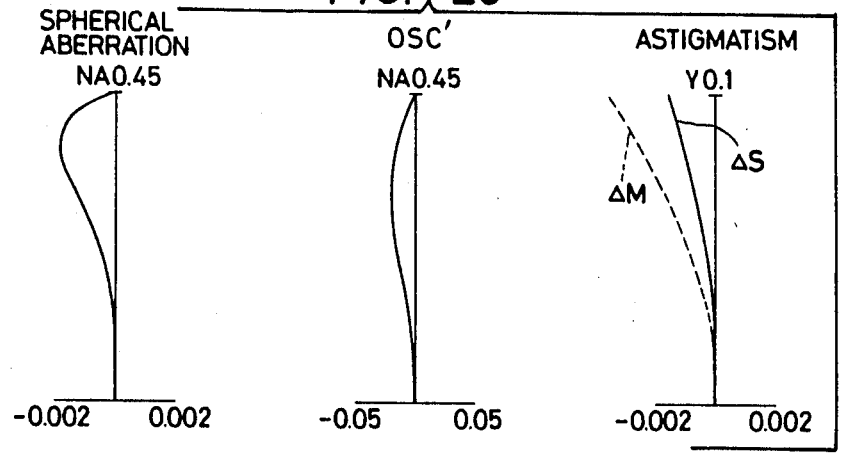
Figure 29:
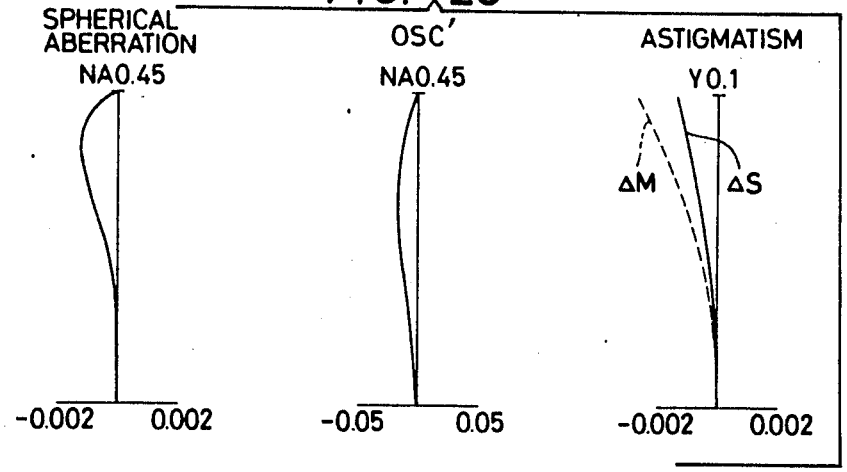
Figure 30:
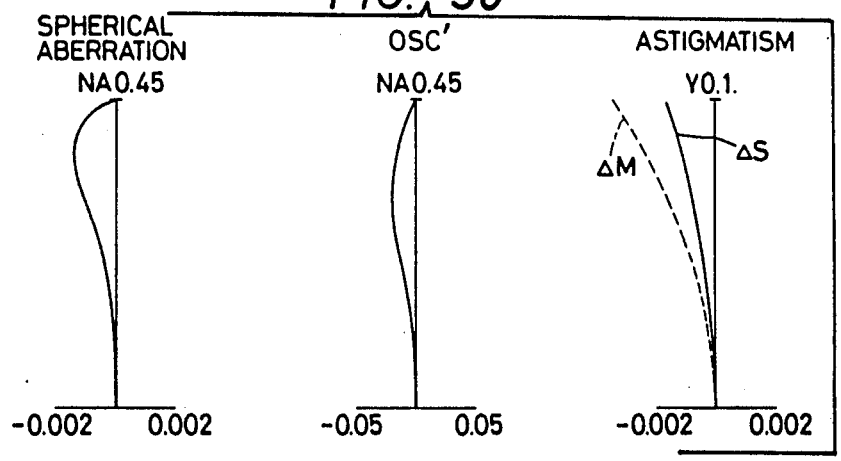
Figure 31:
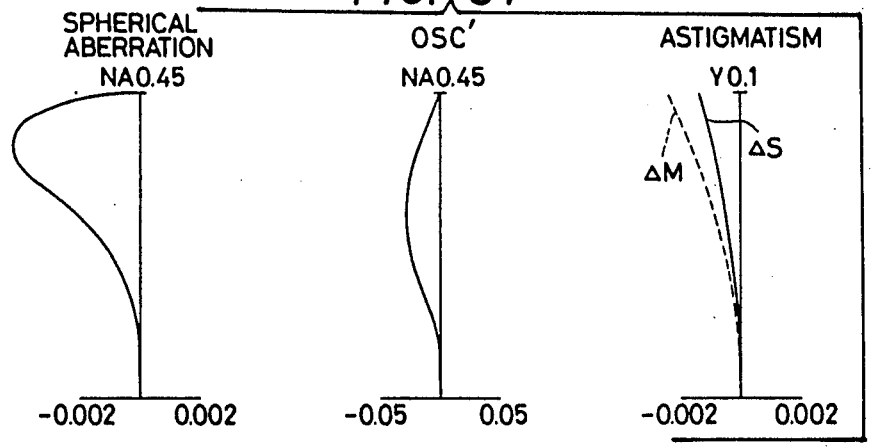
Figure 32:
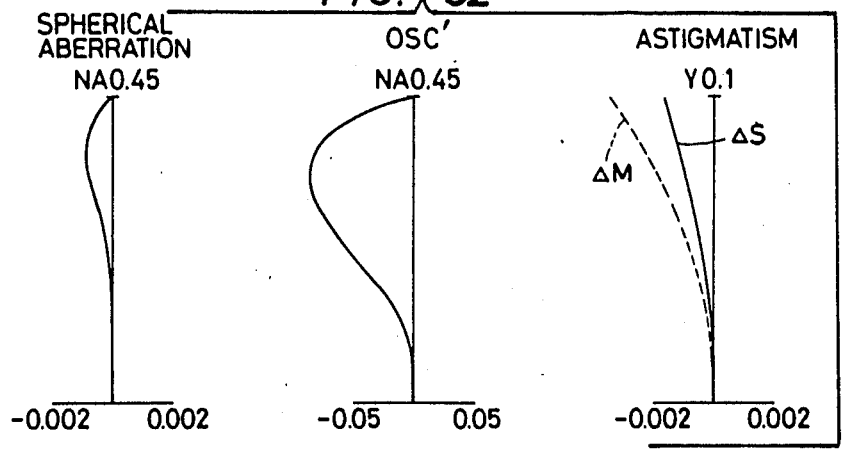
Figure 33:
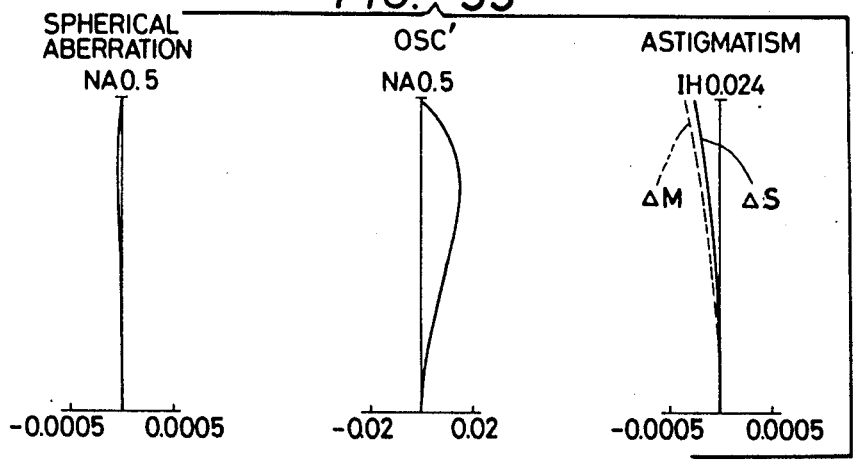
Figure 34:
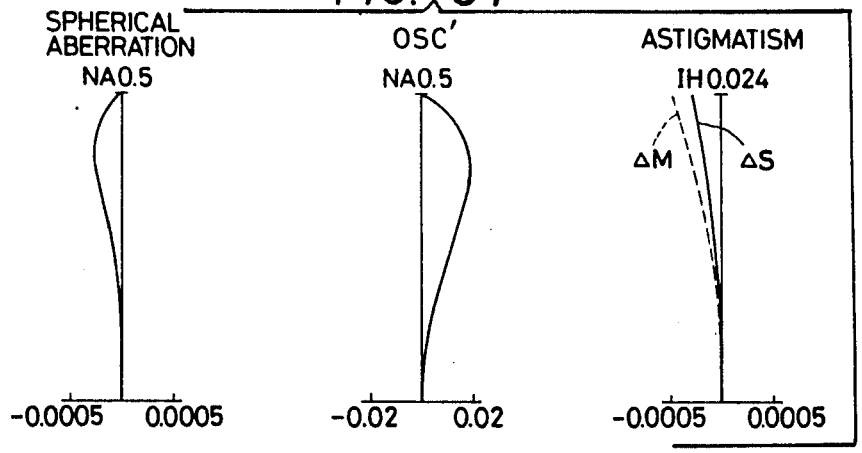
Figure 35:
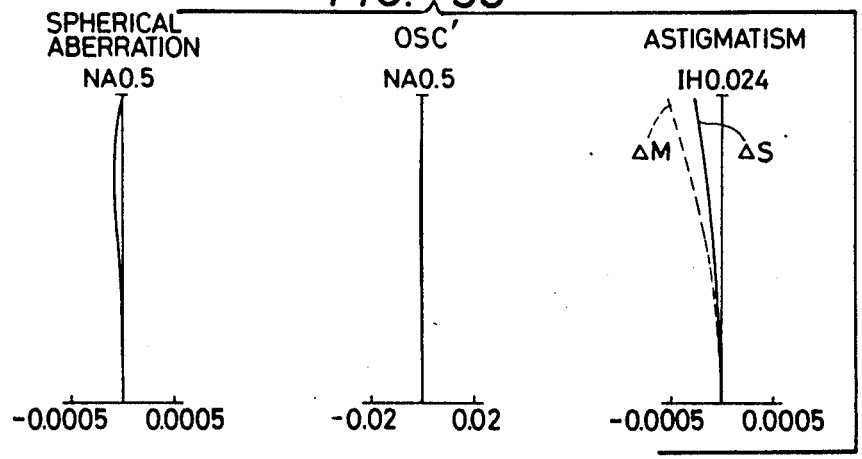
Figure 36:
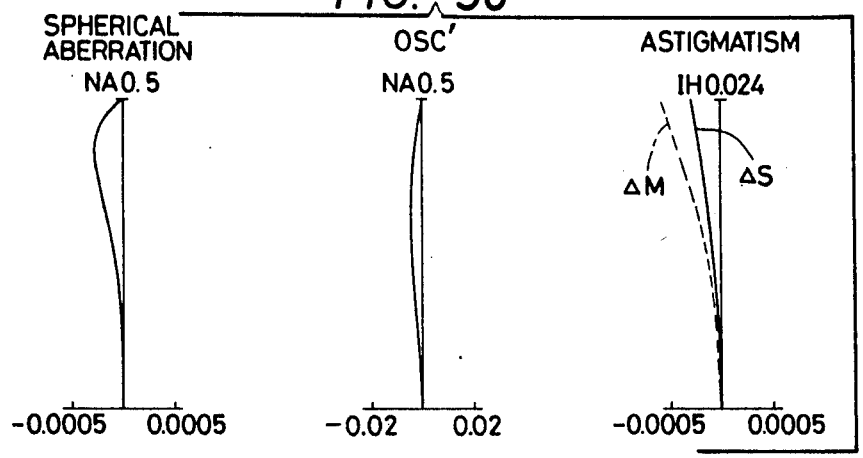
Figure 37:
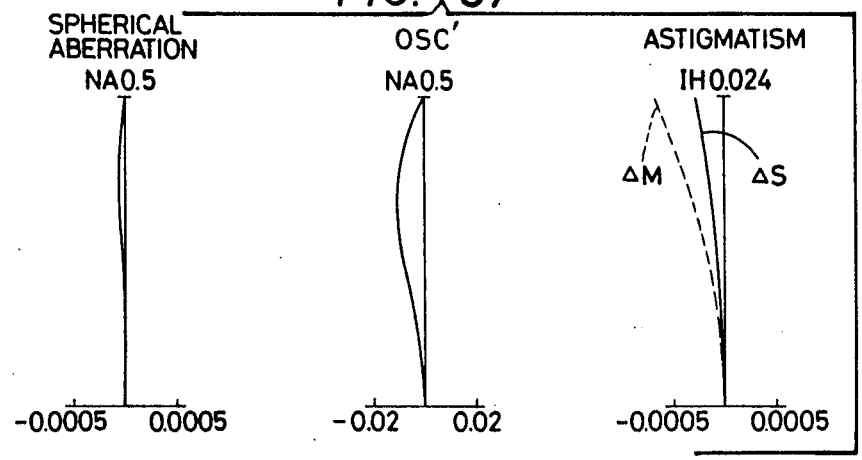
Figure 38:
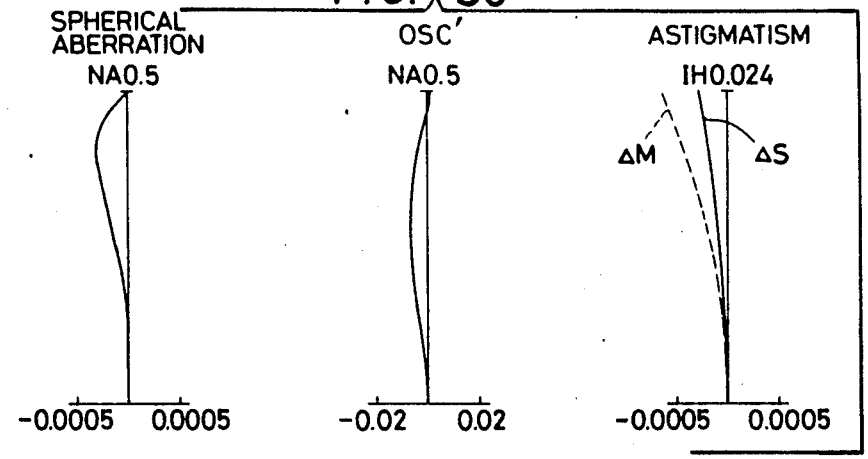
Figure 39:
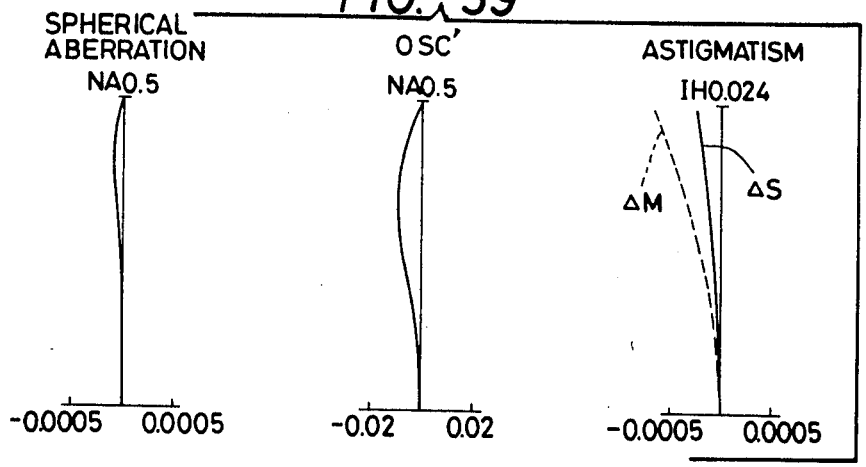
Figure 40:
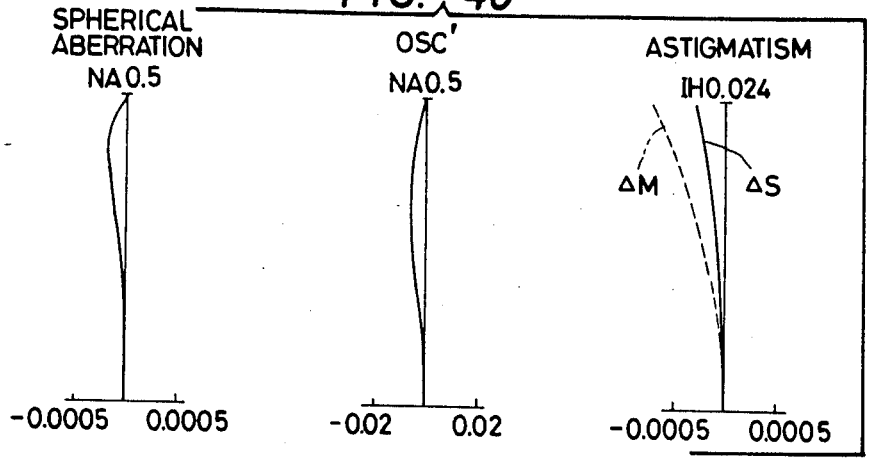
Figure 41:
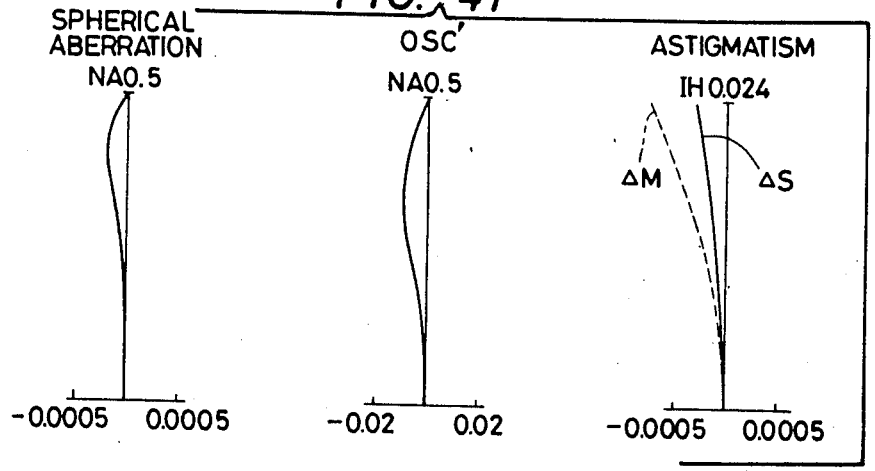
Figure 45:
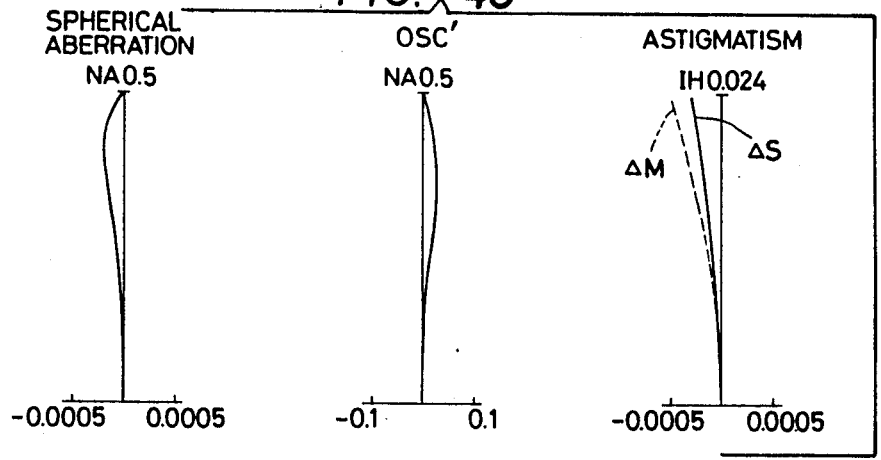
Figure 46:
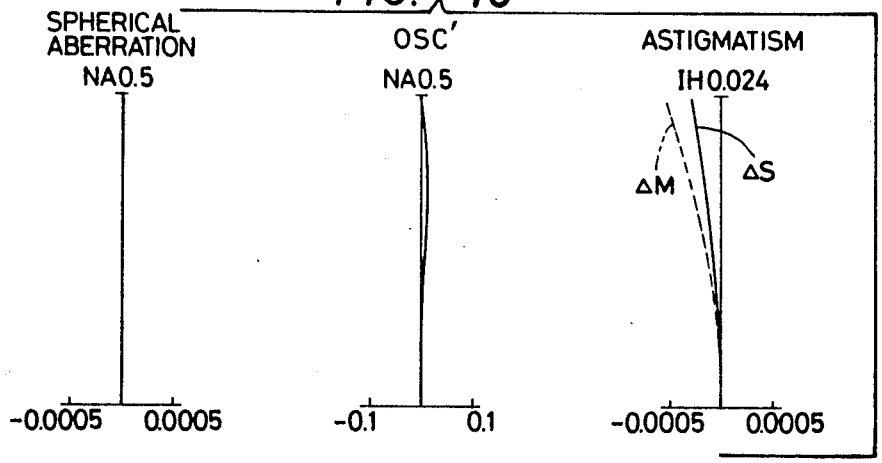
Figure 47:
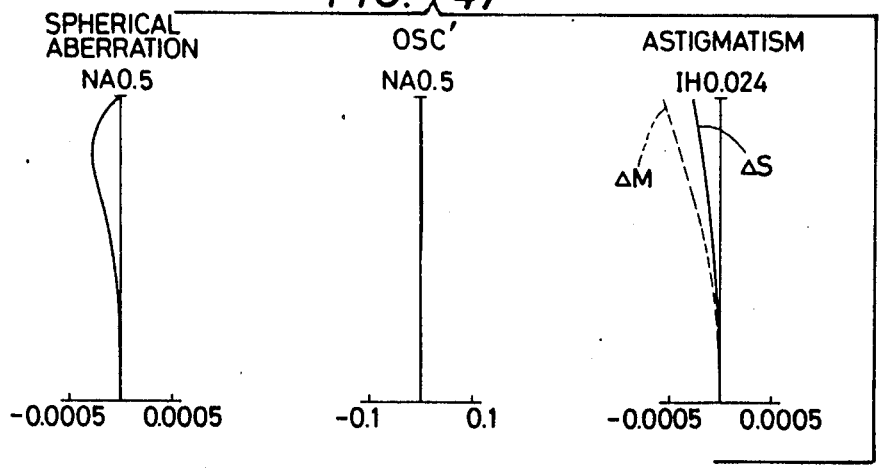
Figure 54:
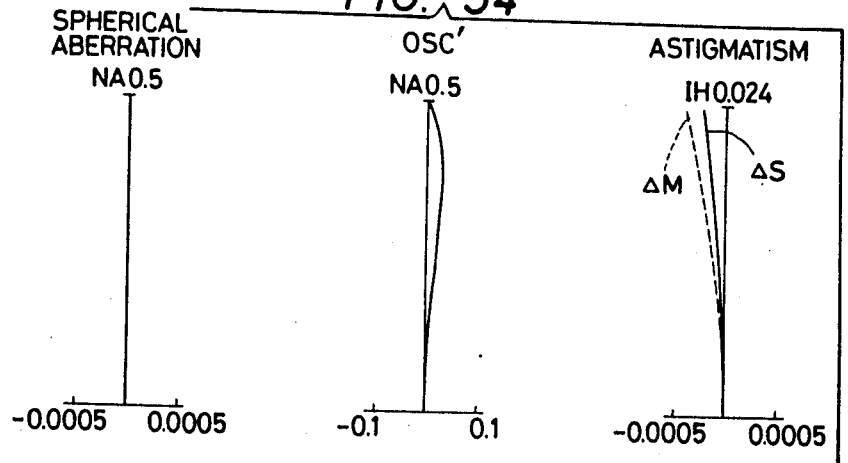
Figure 55:
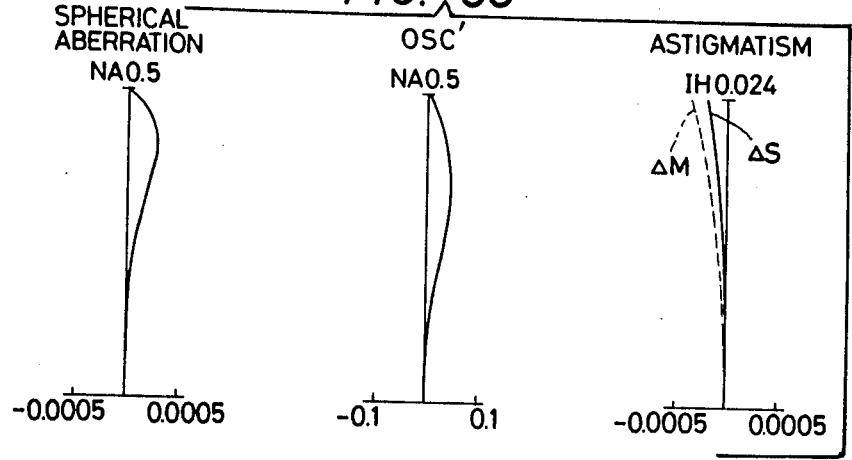
Figure 56:
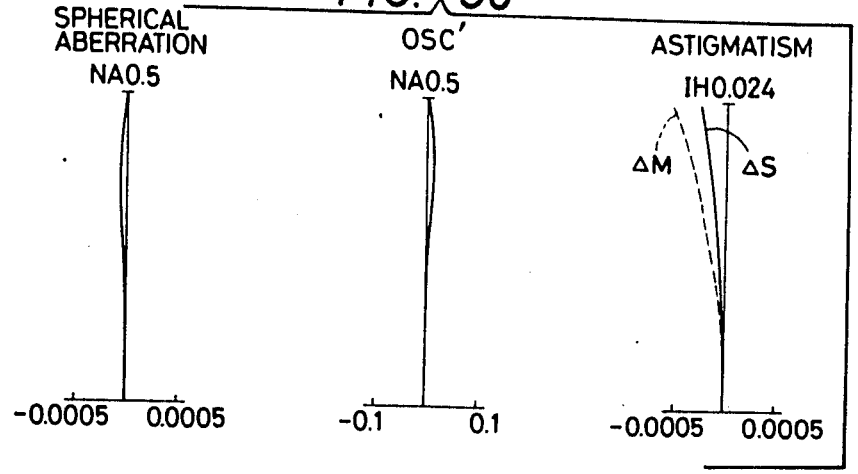
Figure 57:
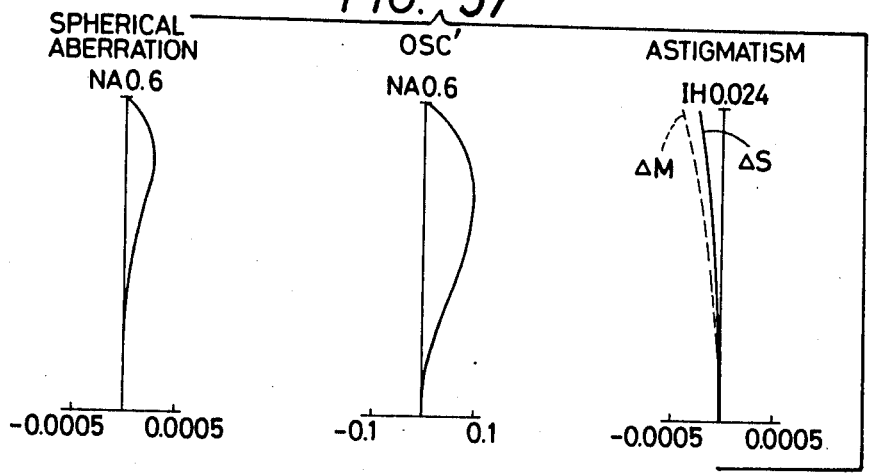
Figure 58:
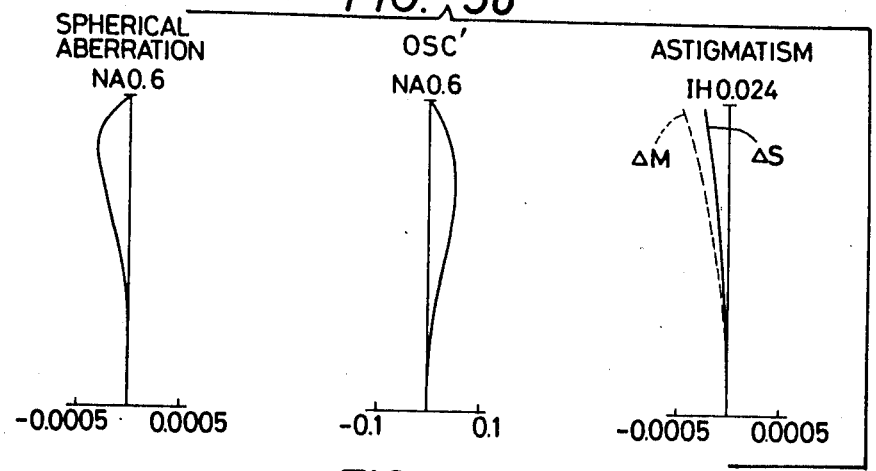
Figure 59:
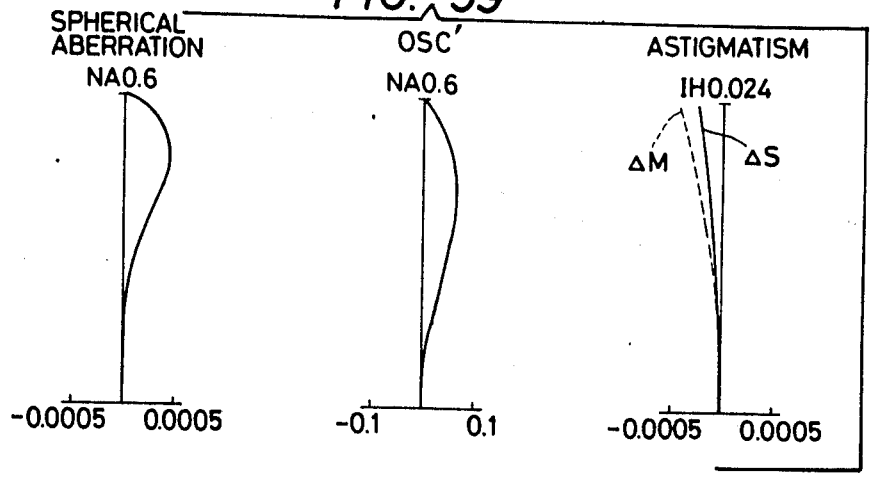
Figure 63:
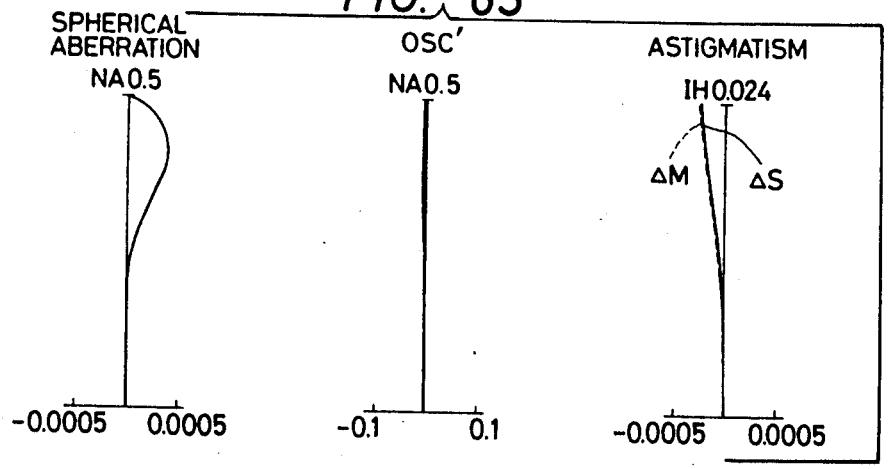
Figure 64:
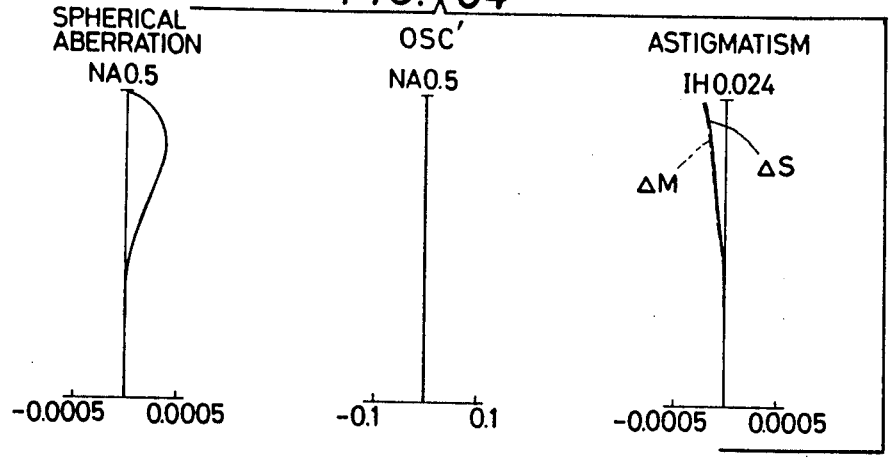
Figure 65:
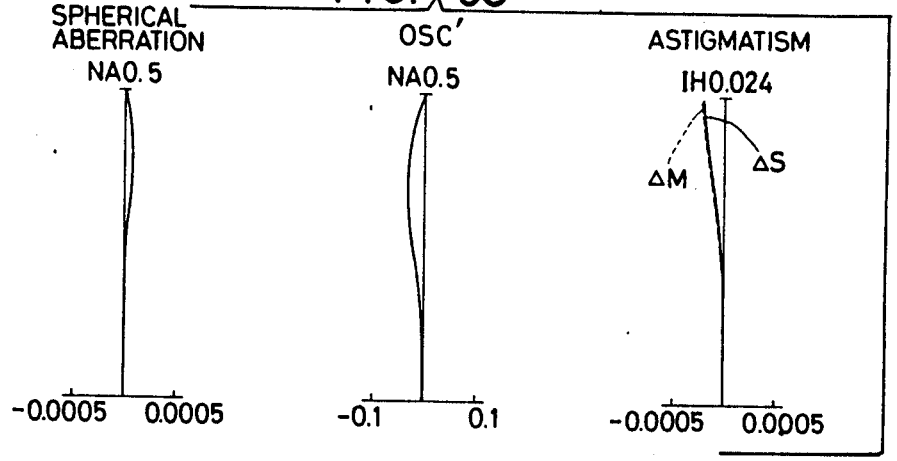
Figure 66:
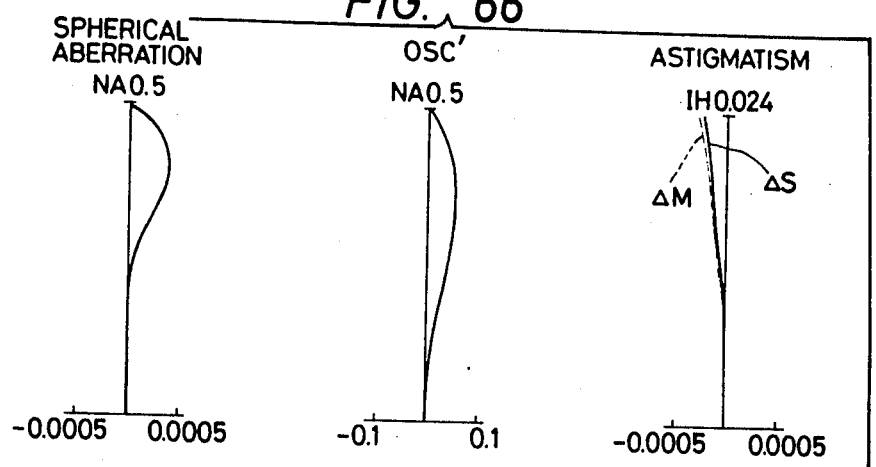
Figure 67:
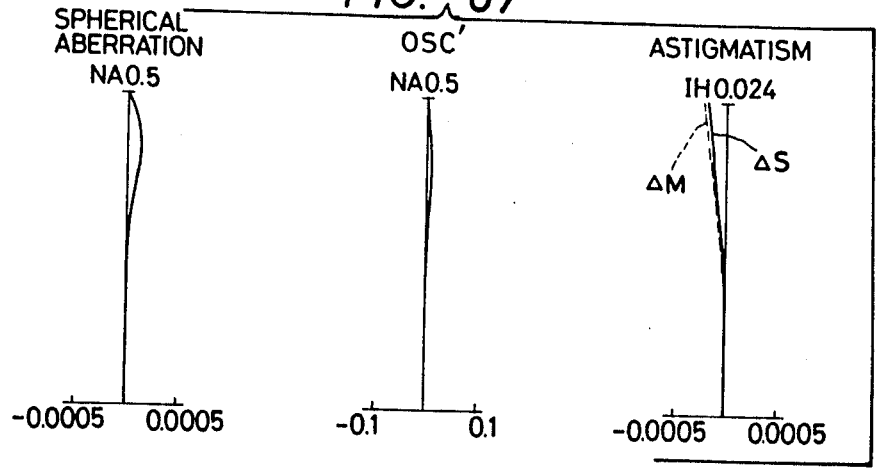
Figure 68:
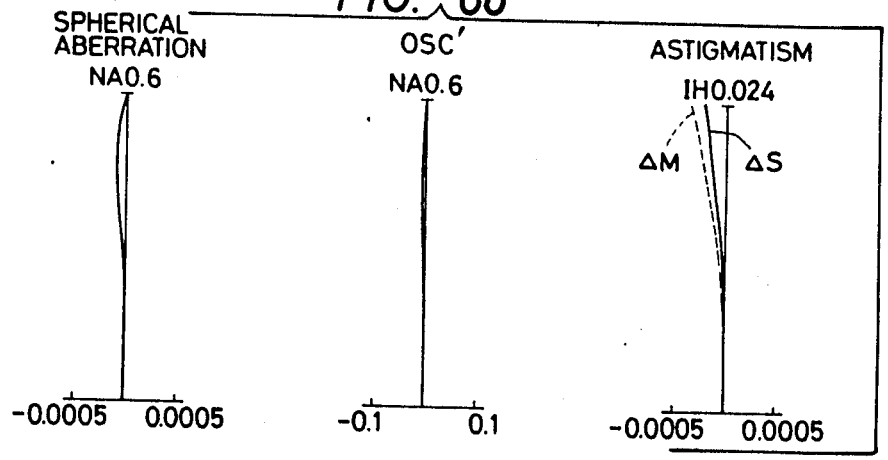
Figure 69:
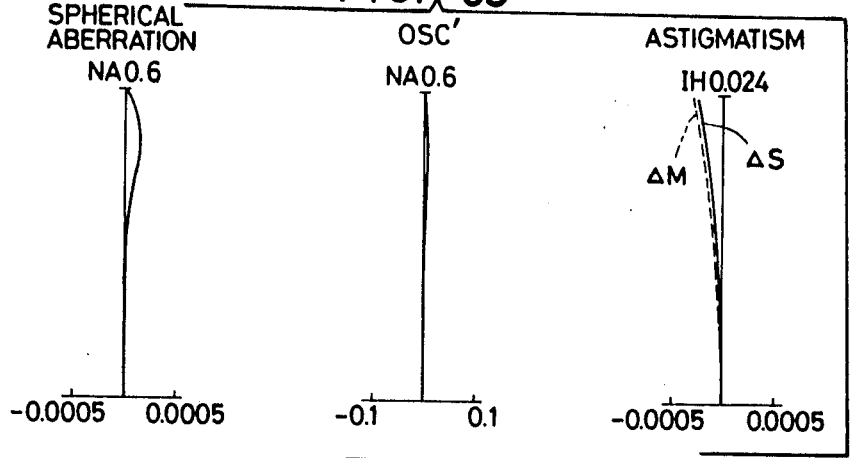
Figure 70:
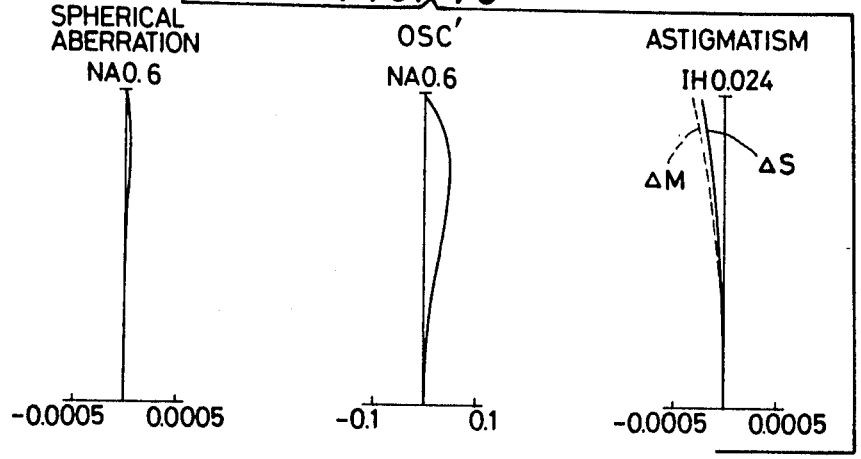
Figure 71:
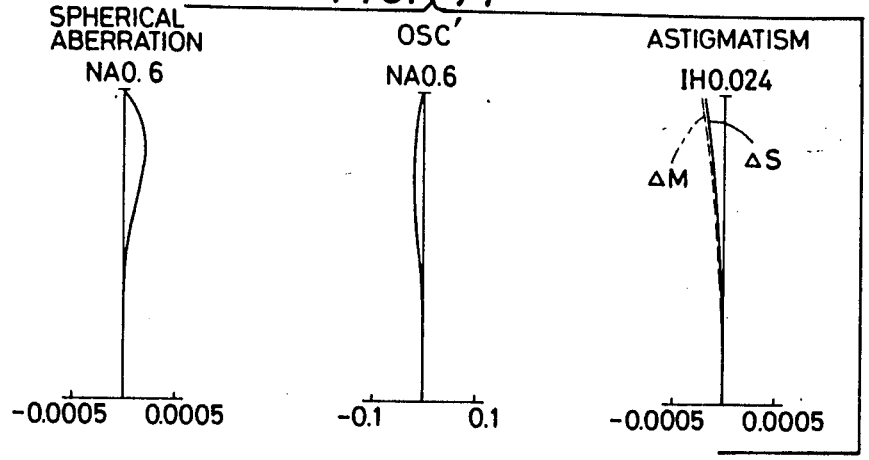
Figure 72:
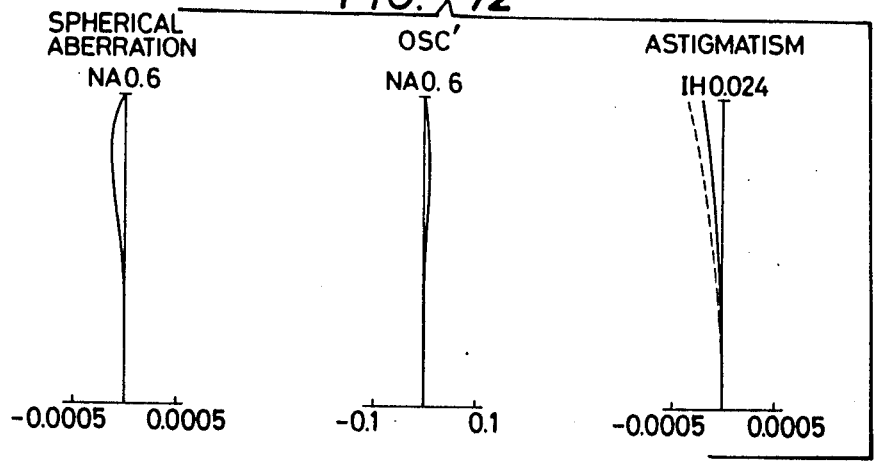
Figure 73:
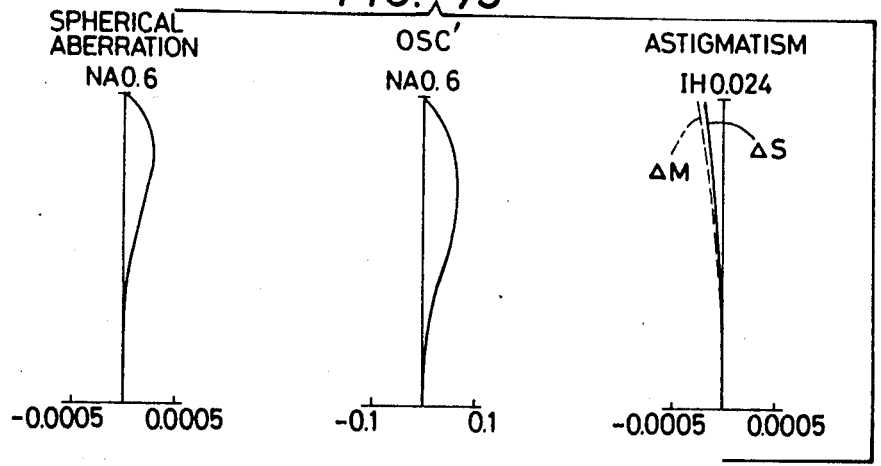
Figure 74:
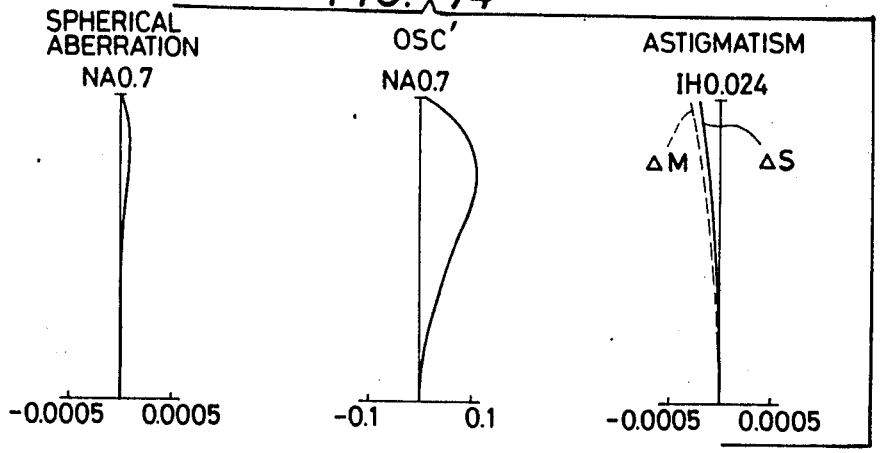

Among them, each of Embodiments 52 through 56, 58 through 60 and 62 according to the present invention is a biconvex lens as shown in FIG. 10, and Embodiments 57, 61, 63 and 64 according to the present invention is a positive meniscus lens as shown in FIG. 11.

In Embodiments 1 through 21 of the above mentioned Embodiments according to the present invention, aberrations are corrected for the lens system involving the disk whose thickness and refractive index are 1.2 mm and 1.55 respectively, and in the aberration curves of the respective Embodiments shown as FIG. 12 through 32, the above mentioned disk is taken into account.

In Embodiments 22 through 64 according to the present invention, aberrations are also corrected for the lens system involving the disk whose thickness and refractive index are 0.288 mm and 1.55 respectively, and in the aberration curves of respective Embodiments, the above mentioned disk is also taken into account.

In Embodiments 1 through 64, all of higher-order coefficients than $h_6$ are regarded as zero.

As is mentioned above, in the GRIN single lens system according to the present invention, N.A. is large and various aberrations including off-axial aberration especially coma are corrected excellently.

What is claimed is:

1. A graded refractive index single lens system comprising at least one surface formed spherically, having refractive index n expressed by the formula shown below wherein $n_0$ represents the refractive index on the optical axis of said lens and r represent the radial distance from the optical axis, and satisfying the conditions (1), (2) and (3) shown below:

$$n^2 = n_0^2[1 - (gr)^2 + h_4(gr)^4 + h_6(gr)^6 + \ldots]$$

$$gD < 0.51 \quad (1)$$

$$0.3 < g\phi < 0.7 \quad (2)$$

$$0.28f < D \quad (3)$$

where g is a parameter representing the degree of the gradient of the refractive index distribution, $h_4$ and $h_6$ respectively represent the 4th- and 6th-order coefficients of said refractive index distribution, D represents the length of said lens, $\phi$ represents the diameter of said lens and f represents the focal length of said lens.

2. A graded refractive index single lens system according to claim 1 wherein said graded refractive index single lens system has the following numerical data:

R₁ = 2.847    R₂ = ∞        D = 2.3       n₀ = 1.65
g = 0.12      h₄ = 2.404    h₆ = 47.99    φ = 3.2
f = 3.5556    NA = 0.45     WD = 1.21     gD = 0.340
gφ = 0.384    D/f = 0.796 where $R_1$ and $R_2$ respectively represent the radii of curvatures of the incident side surface and the exit side surface.

3. A graded refractive index single lens system according to claim 1 wherein said graded refractive index single lens system has the following numerical data:

R₁ = 3.009    R₂ = −62.404  D = 3.333     n₀ = 1.65
g = 0.12      h₄ = 1.716    h₆ = 32.20    φ = 3.2
f = 3.5556    NA = 0.45     WD = 0.99     gD = 0.400
gφ = 0.384    D/f = 0.937 where $R_1$ and $R_2$ respectively represent the radii of curvatures of the incident side surface and the exit side surface.

4. A graded refractive index single lens system according to claim 1 wherein said graded refractive index single lens system has the following numerical data:

R₁ = 3.194    R₂ = −24.832  D = 3.750     n₀ = 1.65
g = 0.12      h₄ = 1.298    h₆ = 23.65    φ = 3.2
f = 3.5556    NA = 0.45     WD = 0.84     gD = 0.45
gφ = 0.384    D/f = 1.055 where $R_1$ and $R_2$ respectively represent the radii of curvatures of the incident side surface and the exit side surface.

5. A graded refractive index single lens system according to claim 1 wherein said graded refractive index single lens system has the following numerical data:

R₁ = 3.458    R₂ = −12.852  D = 4.167     n₀ = 1.65
g = 0.12      h₄ = 1.082    h₆ = 18.89    φ = 3.2
f = 3.5556    NA = 0.45     WD = 0.73     gD = 0.5
gφ = 0.384    D/f = 1.172 where $R_1$ and $R_2$ respectively represent the radii of curvatures of the incident side surface and the exit side surface.

6. A graded refractive index single lens system according to claim 1 wherein said graded refractive index single lens system has the following numerical data:

R₁ = 2.649    R₂ = 60.550   D = 1.333     n₀ = 1.65
g = 0.15      h₄ = −0.597   h₆ = −2.040   φ = 3.2
f = 3.5556    NA = 0.45     WD = 2.01     gD = 0.2
gφ = 0.48     D/f = 0.375 where $R_1$ and $R_2$ respectively represent the radii of curvatures of the incident side surface and the exit side surface.

7. A graded refractive index single lens system according to claim 1 wherein said graded refractive index single lens system has the following numerical data:

| | | | |
|---|---|---|---|
| $R_1 = 2.716$ | $R_2 = 40.040$ | $D = 1.667$ | $n_0 = 1.65$ |
| $g = 0.15$ | $h_4 = -0.611$ | $h_6 = -0.923$ | $\phi = 3.2$ |
| $f = 3.5556$ | $NA = 0.45$ | $WD = 1.82$ | $gD = 0.25$ |
| $g\phi = 0.48$ | $D/f = 0.469$ | | | where $R_1$ and $R_2$ respectively represent the radii of curvatures of the incident side surface and the exit side surface.

8. A graded refractive index single lens system according to claim 1 wherein said graded refractive index single lens system has the following numerical data:

| | | | |
|---|---|---|---|
| $R_1 = 2.792$ | $R_2 = 30.725$ | $D = 2.0$ | $n_0 = 1.65$ |
| $g = 0.15$ | $h_4 = -0.646$ | $h_6 = -0.816$ | $\phi = 3.2$ |
| $f = 3.5556$ | $NA = 0.45$ | $WD = 1.64$ | $gD = 0.3$ |
| $g\phi = 0.48$ | $D/f = 0.562$ | | | where $R_1$ and $R_2$ respectively represent the radii of curvatures of the incident side surface and the exit side surface.

9. A graded refractive index single lens system according to claim 1 wherein said graded refractive index single lens system has the following numerical data:

| | | | |
|---|---|---|---|
| $R_1 = 2.877$ | $R_2 = 25.630$ | $D = 2.333$ | $n_0 = 1.65$ |
| $g = 0.15$ | $h_4 = -0.691$ | $h_6 = -0.993$ | $\phi = 3.2$ |
| $f = 3.5556$ | $NA = 0.45$ | $WD = 1.45$ | $gD = 0.35$ |
| $g\phi = 0.48$ | $D/f = 0.656$ | | | where $R_1$ and $R_2$ respectively represent the radii of curvatures of the incident side surface and the exit side surface.

10. A graded refractive index single lens system according to claim 1 wherein said graded refractive index single lens system has the following numerical data:

| | | | |
|---|---|---|---|
| $R_1 = 2.973$ | $R_2 = 22.668$ | $D = 2.667$ | $n_0 = 1.65$ |
| $g = 0.15$ | $h_4 = -0.735$ | $h_6 = -1.227$ | $\phi = 3.2$ |
| $f = 3.5556$ | $NA = 0.45$ | $WD = 1.28$ | $gD = 0.4$ |
| $g\phi = 0.48$ | $D/f = 0.750$ | | | where $R_1$ and $R_2$ respectively represent the radii of curvatures of the incident side surface and the exit side surface.

11. A graded refractive index single lens system according to claim 1 wherein said graded refractive index single lens system has the following numerical data:

| | | | |
|---|---|---|---|
| $R_1 = 3.081$ | $R_2 = 21.061$ | $D = 3.0$ | $n_0 = 1.65$ |
| $g = 0.15$ | $h_4 = -0.774$ | $h_6 = -1.420$ | $\phi = 3.2$ |
| $f = 3.5556$ | $NA = 0.45$ | $WD = 1.11$ | $gD = 0.45$ |
| $g\phi = 0.48$ | $D/f = 0.844$ | | | where $R_1$ and $R_2$ respectively represent the radii of curvatures of the incident side surface and the exit side surface.

12. A graded refractive index single lens system according to claim 1 wherein said graded refractive index single lens system has the following numerical data:

| | | | |
|---|---|---|---|
| $R_1 = 3.206$ | $R_2 = 20.562$ | $D = 3.333$ | $n_0 = 1.65$ |
| $g = 0.15$ | $h_4 = -0.802$ | $h_6 = -1.526$ | $\phi = 3.2$ |
| $f = 3.5556$ | $NA = 0.45$ | $WD = 0.95$ | $gD = 0.5$ |
| $g\phi = 0.48$ | $D/f = 0.937$ | | | where $R_1$ and $R_2$ respectively represent the radii of curvatures of the incident side surface and the exit side surface.

13. A graded refractive index single lens system according to claim 1 wherein said graded refractive index single lens system has the following numerical data:

| | | | |
|---|---|---|---|
| $R_1 = 2.916$ | $R_2 = 17.811$ | $D = 2.059$ | $n_0 = 1.65$ |
| $g = 0.17$ | $h_4 = -1.247$ | $h_6 = -5.704$ | $\phi = 3.2$ |
| $f = 3.5556$ | $NA = 0.45$ | $WD = 1.59$ | $gD = 0.35$ |
| $g\phi = 0.544$ | $D/f = 0.579$ | | | where $R_1$ and $R_2$ respectively represent the radii of curvatures of the incident side surface and the exit side surface.

14. A graded refractive index single lens system according to claim 1 wherein said graded refractive index single lens system has the following numerical data:

| | | | |
|---|---|---|---|
| $R_1 = 3.009$ | $R_2 = 14.981$ | $D = 2.353$ | $n_0 = 1.65$ |
| $g = 0.17$ | $h_4 = -1.163$ | $h_6 = -4.370$ | $\phi = 3.2$ |
| $f = 3.5556$ | $NA = 0.45$ | $WD = 1.44$ | $gD = 0.4$ |
| $g\phi = 0.544$ | $D/f = 0.662$ | | | where $R_1$ and $R_2$ respectively represent the radii of curvatures of the incident side surface and the exit side surface.

15. A graded refractive index single lens system according to claim 1 wherein said graded refractive index single lens system has the following numerical data:

| | | | |
|---|---|---|---|
| $R_1 = 3.110$ | $R_2 = 12.932$ | $D = 2.647$ | $n_0 = 1.65$ |
| $g = 0.17$ | $h_4 = -1.099$ | $h_6 = -3.524$ | $\phi = 3.2$ |
| $f = 3.5556$ | $NA = 0.45$ | $WD = 1.28$ | $gD = 0.45$ |
| $g\phi = 0.544$ | $D/f = 0.744$ | | | where $R_1$ and $R_2$ respectively represent the radii of curvatures of the incident side surface and the exit side surface.

16. A graded refractive index single lens system according to claim 1 wherein said graded refractive index single lens system has the following numerical data:

| | | | |
|---|---|---|---|
| $R_1 = 3.219$ | $R_2 = 11.371$ | $D = 2.941$ | $n_0 = 1.65$ |
| $g = 0.17$ | $h_4 = -1.047$ | $h_6 = -2.937$ | $\phi = 3.2$ |
| $f = 3.5556$ | $NA = 0.45$ | $WD = 1.12$ | $gD = 0.5$ |
| $g\phi = 0.544$ | $D/f = 0.827$ | | | where $R_1$ and $R_2$ respectively represent the radii of curvatures of the incident side surface and the exit side surface.

17. A graded refractive index single lens system according to claim 1 wherein said graded refractive index single lens system has the following numerical data:

| | | | |
|---|---|---|---|
| $R_1 = 3.206$ | $R_2 = 9.178$ | $D = 2.250$ | $n_0 = 1.65$ |
| $g = 0.20$ | $h_4 = -1.092$ | $h_6 = -2.748$ | $\phi = 3.2$ |
| $f = 3.5556$ | $NA = 0.45$ | $WD = 1.48$ | $gD = 0.45$ |
| $g\phi = 0.64$ | $D/f = 0.633$ | | |

-continued where $R_1$ and $R_2$ respectively represent the radii of curvatures of the incident side surface and the exit side surface.

18. A graded refractive index single lens system according to claim 1 wherein said graded refractive index single lens system has the following numerical data:

| | | | |
|---|---|---|---|
| $R_1 = 3.318$ | $R_2 = 7.883$ | $D = 2.5$ | $n_0 = 1.65$ |
| $g = 0.20$ | $h_4 = -0.986$ | $h_6 = -2.099$ | $\phi = 3.2$ |
| $f = 3.5556$ | $NA = 0.45$ | $WD = 1.34$ | $gD = 0.5$ |
| $g\phi = 0.64$ | $D/f = 0.703$ | | | where $R_1$ and $R_2$ respectively represent the radii of curvatures of the incident side surface and the exit side surface.

19. A graded refractive index single lens system according to claim 1 wherein said graded refractive index single lens system has the following numerical data:

| | | | |
|---|---|---|---|
| $R_1 = 3.148$ | $R_2 = 65.733$ | $D = 3.5$ | $n_0 = 1.7$ |
| $g = 0.12$ | $h_4 = 0.909$ | $h_6 = 19.14$ | $\phi = 3.2$ |
| $f = 3.5556$ | $NA = 0.45$ | $WD = 0.89$ | $gD = 0.42$ |
| $g\phi = 0.384$ | $D/f = 0.984$ | | | where $R_1$ and $R_2$ respectively represent the radii of curvatures of the incident side surface and the exit side surface.

20. A graded refractive index single lens system according to claim 1 wherein said graded refractive index single lens system has the following numerical data:

| | | | |
|---|---|---|---|
| $R_1 = 3.149$ | $R_2 = 10.286$ | $D = 2.5$ | $n_0 = 1.7$ |
| $g = 0.17$ | $h_4 = -1.169$ | $h_6 = -3.832$ | $\phi = 3.2$ |
| $f = 3.5556$ | $NA = 0.45$ | $WD = 1.34$ | $gD = 0.425$ |
| $g\phi = 0.544$ | $D/f = 0.703$ | | | where $R_1$ and $R_2$ respectively represent the radii of curvatures of the incident side surface and the exit side surface.

21. A graded refractive index single lens system according to claim 1 wherein said graded refractive index single lens system has the following numerical data:

| | | | |
|---|---|---|---|
| $R_1 = 2.760$ | $R_2 = -14.835$ | $D = 3.0$ | $n_0 = 1.55$ |
| $g = 0.13$ | $h_4 = 1.839$ | $h_6 = 36.50$ | $\phi = 3.2$ |
| $f = 3.5556$ | $NA = 0.45$ | $WD = 1.18$ | $gD = 0.39$ |
| $g\phi = 0.416$ | $D/f = 0.844$ | | | where $R_1$ and $R_2$ respectively represent the radii of curvatures of the incident side surface and the exit side surface.

22. A graded refractive index single lens system according to claim 1 wherein said graded refractive index single lens system has the following numerical data:

| | | | |
|---|---|---|---|
| $R_1 = 2.512$ | $R_2 = -43.624$ | $D = 1.5$ | $n_0 = 1.55$ |
| $g = 0.16$ | $h_4 = -0.608$ | $h_6 = -2.217$ | $\phi = 3.2$ |
| $f = 3.5556$ | $NA = 0.45$ | $WD = 1.93$ | $gD = 0.24$ |
| $g\phi = 0.512$ | $D/f = 0.422$ | | | where $R_1$ and $R_2$ respectively represent the radii of curvatures of the incident side surface and the exit side surface.

23. A graded refractive index single lens system comprising at least one surface formed spherically, having refractive index n expressed by the formula shown below wherein $n_0$ represents the refractive index on the optical axis of said lens and r represents the radial distance from the optical axis, and satisfying the conditions (4) and (5) shown below:

$$n^2 = n_0^2[1 - (gr)^2 + h_4(gr)^4 + h_6(gr)^6 + \ldots]$$

$$0.96f < D < 1.536f \quad (4)$$

$$0.63 < gf \quad (5)$$

where g is a parameter representing the degree of the gradient of the refractive index distribution, $h_4$ and $h_6$ respectively represent the 4th- and 6th-order coefficients of said refractive index distribution, D represents the length of said lens and f represents the focal length of said lens.

24. A graded refractive index single lens system according to claim 23 wherein said graded refractive index single lens system has the following numerical data:

| | | | |
|---|---|---|---|
| $R_1 = 1.234$ | $R_2 = 7.004$ | $D = 1.440$ | $n_0 = 1.50$ |
| $g = 0.646$ | $n_4 = -0.500$ | $h_6 = -0.426$ | $f = 1.0$ |
| $NA = 0.5$ | | | | where $R_1$ and $R_2$ respectively represent the radii of curvatures of the incident side surface and the exit side surface.

25. A graded refractive index single lens system according to claim 23 wherein said graded refractive index single lens system has the following numerical data:

| | | | |
|---|---|---|---|
| $R_1 = 1.013$ | $R_2 = 4.115$ | $D = 1.140$ | $n_0 = 1.50$ |
| $g = 0.667$ | $h_4 = -0.718$ | $h_6 = -1.144$ | $f = 1.0$ |
| $NA = 0.5$ | | | | where $R_1$ and $R_2$ respectively represent the radii of curvatures of the incident side surface and the exit side surface.

26. A graded refractive index single lens system according to claim 23 wherein said graded refractive index single lens system has the following numerical data:

| | | | |
|---|---|---|---|
| $R_1 = 1.167$ | $R_2 = 1.230$ | $D = 1.320$ | $n_0 = 1.50$ |
| $g = 0.708$ | $h_4 = -0.530$ | $h_6 = -0.501$ | $f = 1.0$ |
| $NA = 0.5$ | | | | where $R_1$ and $R_2$ respectively represent the radii of curvatures of the incident side surface and the exit side surface.

27. A graded refractive index single lens system according to claim 23 wherein said graded refractive index single lens system has the following numerical data:

| | | | |
|---|---|---|---|
| $R_1 = 1.039$ | $R_2 = 1.719$ | $D = 1.080$ | $n_0 = 1.50$ |
| $g = 0.729$ | $h_4 = -0.640$ | $h_6 = -0.809$ | $f = 1.0$ |
| $NA = 0.5$ | | | | where $R_1$ and $R_2$ respectively represent the radii of curvatures of the incident side surface and the exit side surface.

28. A graded refractive index single lens system according to claim 23 wherein said graded refractive index single lens system has the following numerical data:

| | | | |
|---|---|---|---|
| $R_1 = 1.190$ | $R_2 = 0.699$ | $D = 1.200$ | $n_0 = 1.50$ |
| $g = 0.792$ | $h_4 = -0.385$ | $h_6 = -0.221$ | $f = 1.0$ |
| $NA = 0.5$ | | | | where $R_1$ and $R_2$ respectively represent the radii of curvatures of the incident side surface and the exit side surface.

29. A graded refractive index single lens system according to claim 23 wherein said graded refractive index single lens system has the following numerical data:

| | | | |
|---|---|---|---|
| $R_1 = 1.025$ | $R_2 = 1.462$ | $D = 1.080$ | $n_0 = 1.65$ |
| $g = 0.646$ | $h_4 = -0.847$ | $h_6 = -1.547$ | $f = 1.0$ |
| $NA = 0.5$ | | | | where $R_1$ and $R_2$ respectively represent the radii of curvatures of the incident side surface and the exit side surface.

30. A graded refractive index single lens system according to claim 23 wherein said graded refractive index single lens system has the following numerical data:

| | | | |
|---|---|---|---|
| $R_1 = 1.244$ | $R_2 = 0.630$ | $D = 1.368$ | $n_0 = 1.65$ |
| $g = 0.688$ | $h_4 = -0.533$ | $h_6 = -0.501$ | $f = 1.0$ |
| $NA = 0.5$ | | | | where $R_1$ and $R_2$ respectively represent the radii of curvatures of the incident side surface and the exit side surface.

31. A graded refractive index single lens system according to claim 23 wherein said graded refractive index single lens system has the following numerical data:

| | | | |
|---|---|---|---|
| $R_1 = 1.117$ | $R_2 = 0.874$ | $D = 1.140$ | $n_0 = 1.65$ |
| $g = 0.708$ | $h_4 = -0.628$ | $h_6 = -0.719$ | $f = 1.0$ |
| $NA = 0.5$ | | | | where $R_1$ and $R_2$ respectively represent the radii of curvatures of the incident side surface and the exit side surface.

32. A graded refractive index single lens system according to claim 23 wherein said graded refractive index single lens system has the following numerical data:

| | | | |
|---|---|---|---|
| $R_1 = 1.103$ | $R_2 = 0.902$ | $D = 1.020$ | $n_0 = 1.65$ |
| $g = 0.750$ | $h_4 = -0.570$ | $h_6 = -0.568$ | $f = 1.0$ |
| $NA = 0.5$ | | | | where $R_1$ and $R_2$ respectively represent the radii of curvatures of the incident side surface and the exit side surface.

33. A graded refractive index single lens system according to claim 23 wherein said graded refractive index single lens system has the following numerical data:

| | | | |
|---|---|---|---|
| $R_1 = 1.231$ | $R_2 = 2.313$ | $D = 1.440$ | $n_0 = 1.50$ |
| $g = 0.667$ | $h_4 = -0.510$ | $h_6 = -0.489$ | $f = 1.0$ |
| $NA = 0.6$ | | | | where $R_1$ and $R_2$ respectively represent the radii of curvatures of the incident side surface and the exit side surface.

34. A graded refractive index single lens system according to claim 23 wherein said graded refractive index single lens system has the following numerical data:

| | | | |
|---|---|---|---|
| $R_1 = 1.213$ | $R_2 = 1.065$ | $D = 1.380$ | $n_0 = 1.50$ |
| $g = 0.708$ | $h_4 = -0.488$ | $h_6 = -0.432$ | $f = 1.0$ |
| $NA = 0.6$ | | | | where $R_1$ and $R_2$ respectively represent the radii of curvatures of the incident side surface and the exit side surface.

35. A graded refractive index single lens system comprising at least one surface formed spherically, having refractive index n expressed by the formula shown below wherein $n_0$ represents the refractive index on the optical axis of said lens and r represents the radial distance from the optical axis, and satisfying the conditions (6), (7) and (8) shown below:

$$n^2 = n_0^2[1-(gr)^2+h_4(gr)^4+h_6(gr)^6+\ldots]$$

$$D < 1.08f \quad (6)$$

$$gf < 0.604 \quad (7)$$

$$0.51 < gD \quad (8)$$

where g is a parameter representing the degree of the gradient of the refractive index distribution, $h_4$ and $h_6$ respectively represent the 4th- and 6th-order coefficients of said refractive index distribution, D represents the length of said lens and f represents the focal length of said lens.

36. A graded refractive index single lens system according to claim 35, further satisfying the conditions (9), (10) shown below:

$$2 < |R_2/R_1| \quad (9)$$

$$h_4 < \quad (10)$$

where $R_1$ and $R_2$ respectively represent the radii of curvatures of the incident side surface and the exit side surface.

37. A graded refractive index single lens system according to claim 36 wherein said graded refractive index single lens system has the following numerical data:

| | | | |
|---|---|---|---|
| $R_1 = 0.866$ | $R_2 = -4.095$ | $D = 1.02$ | $n_0 = 1.5$ |
| $g = 0.563$ | $h_4 = -0.468$ | $h_6 = 0.822$ | $f = 1.0$ |
| $NA = 0.5$ | $WD = 0.283$ | | | where $R_1$ and $R_2$ respectively represent the radii of curvatures of the incident side surface and the exit side surface.

38. A graded refractive index single lens system according where $R_1$ and $R_2$ respectively represent the radii of curvatures of the incident side surface and the exit side surface.

39. A graded refractive index single lens system according to claim 36 wherein said graded refractive index single lens system has the following numerical data:

| | | | |
|---|---|---|---|
| $R_1 = 0.903$ | $R_2 = 5.311$ | $D = 1.010$ | $n_0 = 1.65$ |
| $g = 0.521$ | $h_4 = -0.699$ | $h_6 = -0.666$ | $f = 1.0$ |
| $NA = 0.5$ | $WD = 0.259$ | | | where $R_1$ and $R_2$ respectively represent the radii of curvatures of the incident side surface and the exit side surface.

40. A graded refractive index single lens systems according to claim 36 wherein sid graded refractive index single lens system has the following numerical data:

| | | | |
|---|---|---|---|
| $R_1 = 0.966$ | $R_2 = 2.452$ | $D = 1.060$ | $n_0 = 1.65$ |
| $g = 0.585$ | $h_4 = -0.936$ | $h_6 = -2.223$ | $f = 1.0$ |
| $NA = 0.5$ | $WD = 0.223$ | | | where $R_1$ and $R_2$ respectively represent the radii of curvatures of the incident side surface and the exit side surface.

41. A graded refractive index single lens system according to claim 36 wherein said graded refractive index single lens system has the following numerical data:

| | | | |
|---|---|---|---|
| $R_1 = 0.905$ | $R_2 = 20.534$ | $D = 1.070$ | $n_0 = 1.65$ |
| $g = 0.479$ | $h_4 = -0.210$ | $h_6 = 4.469$ | $f = 1.0$ |
| $NA = 0.5$ | $WD = 0.240$ | | | where $R_1$ and $R_2$ respectively represent the radii of curvatures of the incident side surface and the exit side surface.

42. A graded refractive index single lens system according to claim 36 wherein said graded refractive index single lens system has the following numerical data:

| | | | |
|---|---|---|---|
| $R_1 = 0.932$ | $R_2 = 3.942$ | $D = 1.050$ | $n_0 = 1.65$ |
| $g = 0.542$ | $h_4 = -0.846$ | $h_6 = -1.904$ | $f = 1.0$ |
| $NA = 0.55$ | $WD = 0.237$ | | | where $R_1$ and $R_2$ respectively represent the radii of curvatures of the incident side surface and the exit side surface.

43. A graded refractive index single lens system according to claim 36 wherein said graded refractive index single lens system has the following numerical data:

| | | | |
|---|---|---|---|
| $R_1 = 0.891$ | $R_2 = 3.727$ | $D = 0.924$ | $n_0 = 1.65$ |
| $g = 0.554$ | $h_4 = -0.886$ | $h_6 = -2.415$ | $f = 1.0$ |
| $NA = 0.55$ | $WD = 0.295$ | | | where $R_1$ and $R_2$ respectively represent the radii of curvatures of the incident side surface and the exit side surface.

44. A graded refractive index single lens system according to claim 36 wherein said graded refractive index single lens system has the following numerical data:

| | | | |
|---|---|---|---|
| $R_1 = 0.871$ | $R_2 = -6.682$ | $D = 1.020$ | $n_0 = 1.5$ |
| $g = 0.583$ | $h_4 = -0.657$ | $h_6 = -0.832$ | $f = 1.0$ |
| $NA = 0.6$ | $WD = 0.275$ | | | where $R_1$ and $R_2$ respectively represent the radii of curvatures of the incident side surface and the exit side surface.

45. A graded refractive index single lens system according to claim 36 wherein said graded refractive index single lens system has the following numerical data:

| | | | |
|---|---|---|---|
| $R_1 = 0.816$ | $R_2 = -8.201$ | $D = 0.900$ | $n_0 = 1.5$ |
| $g = 0.583$ | $h_4 = -0.649$ | $h_6 = -0.860$ | $f = 1.0$ |
| $NA = 0.6$ | $WD = 0.329$ | | | where $R_1$ and $R_2$ respectively represent the radii of curvatures of the incident side surface and the exit side surface.

46. A graded refractive index single lens system according to claim 36 wherein said graded refractive index single lens system has the following numerical data:

| | | | |
|---|---|---|---|
| $R_1 = 0.915$ | $R_2 = 7.404$ | $D = 1.070$ | $n_0 = 1.65$ |
| $g = 0.504$ | $h_4 = -0.579$ | $h_6 = 0.942$ | $f = 1.0$ |
| $NA = 0.6$ | $WD = 0.234$ | | | where $R_1$ and $R_2$ respectively represent the radii of curvatures of the incident side surface and the exit side surface.

47. A graded refractive index single lens system comprising at least one surface formed spherically, having refractive index n expressed by the formula shown below where $n_0$ represents the refractive index on the optical axis of said lens and r represents the radial distance from the optical axis, and satisfying the conditions (11), (12) and (13) shown below:

$$n^2 = n_0^2[1 - (gr)^2 + h_4(gr)^4 + h_6(gr)^6 + \ldots]$$

$$1.152f < D < 1.392f \quad (11)$$

$$gf < 0.562 \quad (12)$$

$$0.51 < gD \quad (13)$$

where g is a parameter representing the degree of the gradient of the refractive index distribution, $h_4$ and $h_6$ respectively represent the 4th- and 6th-order coefficients of said refractive index distribution, D represents the length of said lens and f represents the focal length of said lens.

48. A graded refractive index single lens system according to claim 47 wherein said graded refractive index single lens system has the following numerical data:

| | | | |
|---|---|---|---|
| $R_1 = 1.075$ | $R_2 = 16.903$ | $D = 1.320$ | $n_0 = 1.65$ |
| $g = 0.521$ | $h_4 = -0.693$ | $h_6 = -0.677$ | $f = 1.0$ |
| $NA = 0.5$ | | | | where $R_1$ and $R_2$ respectively represent the radii of curvatures of the incident side surface and the exit side surface.

49. A graded refractive index single lens system according to claim 47 wherein said graded refractive index single lens system has the following numerical data:

| | | | |
|---|---|---|---|
| $R_1 = 1.069$ | $R_2 = -15.880$ | $D = 1.368$ | $n_0 = 1.80$ |
| $g = 0.375$ | $h_4 = 1.058$ | $h_6 = 21.635$ | $f = 1.0$ |
| $NA = 0.5$ | | | | where $R_1$ and $R_2$ respectively represent the radii of curvatures of the incident side surface and the exit side surface.

50. A graded refractive index single lens system according to claim 47 wherein said graded refractive index single lens system has the following numerical data:

| | | | |
|---|---|---|---|
| $R_1 = 1.035$ | $R_2 = 2.0750$ | $D = 1.248$ | $n_0 = 1.80$ |
| $g = 0.479$ | $h_4 = -0.954$ | $h_6 = -2.156$ | $f = 1.0$ |
| $NA = 0.5$ | | | | where $R_1$ and $R_2$ respectively represent the radii of curvatures of the incident side surface and the exit side surface.

51. A graded refractive index single lens system according to claim 47 wherein said graded refractive index single lens system has the following numerical data:

| | | | |
|---|---|---|---|
| $R_1 = 1.022$ | $R_2 = 115.424$ | $D = 1.272$ | $n_0 = 1.65$ |
| $g = 0.500$ | $h_4 = -0.602$ | $h_6 = 0.441$ | $f = 1.0$ |
| $NA = 0.6$ | | | | where $R_1$ and $R_2$ respectively represent the radii of curvatures of the incident side surface and the exit side surface.

52. A graded refractive index single lens system according to claim 47 wherein said graded refractive index single lens system has the following numerical data:

| | | | |
|---|---|---|---|
| $R_1 = 1.002$ | $R_2 = 4.042$ | $D = 1.200$ | $n_0 = 1.65$ |
| $g = 0.542$ | $h_4 = -0.844$ | $h_6 = -1.800$ | $f = 1.0$ |
| $NA = 0.6$ | | | | where $R_1$ and $R_2$ respectively represent the radii of curvatures of the incident side surface and the exit side surface.

53. A graded refractive index single lens system according to claim 47 wherein said graded refractive index single lens system has the following numerical data:

| | | | |
|---|---|---|---|
| $R_1 = 1.039$ | $R_2 = 5.178$ | $D = 1.320$ | $n_0 = 1.80$ |
| $g = 0.417$ | $h_4 = -0.296$ | $h_6 = 5.302$ | $f = 1.0$ |
| $NA = 0.6$ | | | | where $R_1$ and $R_2$ respectively represent the radii of curvatures of the incident side surface and the exit side surface.

54. A graded refractive index single lens system according to claim 47 wherein said graded refractive index single lens system has the following numerical data:

| | | | |
|---|---|---|---|
| $R_1 = 1.059$ | $R_2 = 2.671$ | $D = 1.320$ | $n_0 = 1.80$ |
| $g = 0.458$ | $h_4 = -0.854$ | $h_6 = 1.367$ | $f = 1.0$ |
| $NA = 0.6$ | | | | where $R_1$ and $R_2$ respectively represent the radii of curvatures of the incident side surface and the exit side surface.

55. A graded refractive index single lens system according to claim 47 wherein said graded refractive index single lens system has the following numerical data:

| | | | |
|---|---|---|---|
| $R_1 = 1.060$ | $R_2 = 10.703$ | $D = 1.320$ | $n_0 = 1.65$ |
| $g = 0.521$ | $h_4 = -0.741$ | $h_6 = -0.911$ | $f = 1.0$ |
| $NA = 0.65$ | | | | where $R_1$ and $R_2$ respectively represent the radii of curvatures of the incident side surface and the exit side surface.

56. A graded refractive index single lens system according to claim 47 wherein said graded refractive index single lens system has the following numerical data:

| | | | |
|---|---|---|---|
| $R_1 = 1.074$ | $R_2 = 3.970$ | $D = 1.368$ | $n_0 = 1.80$ |
| $g = 0.438$ | $h_4 = -0.682$ | $h_6 = -0.661$ | $f = 1.0$ |
| $NA = 0.65$ | | | | where $R_1$ and $R_2$ respectively represent the radii of curvatures of the incident side surface and the exit side surface.

57. A graded refractive index single lens system comprising at least one surface formed spherically, having refractive index n expressed by the formula shown below wherein $n_0$ represents the refractive index on the optical axis of said lens and r represents the radial distance from the optical axis, and satisfying the conditions (14) and (15) shown below:

$$n^2 = n_0^2[1-(gr)^2+h_4(gr)^4+h_6(gr)^6+\ldots]$$

$$1.54f < D \tag{14}$$

$$-4 < (g-0.5)D \tag{15}$$

where g is a parameter representing the degree of the gradient of the refractive index distribution, $h_4$ and $h_6$ respectively represent the 4th- and 6th-order coefficients of said refractive index distribution, D represents the length of said lens and f represents the focal length of said lens.

58. A graded refractive index single lens system according to claim 5 wherein said graded refractive index single lens system has the following numerical data:

| | | | |
|---|---|---|---|
| $R_1 = 1.697$ | $R_2 = -1.356$ | $D = 1.56$ | $n_0 = 1.5$ |
| $g = 0.583$ | $h_4 = 0.208$ | $h_6 = 1.640$ | $f = 1.0$ |
| $NA = 0.5$ | | | | where $R_1$ and $R_2$ respectively represent the radii of curvatures of the incident side surface and the exit side surface.

59. A graded refractive index single lens system according to claim 5 wherein said graded refractive index single lens system has the following numerical data:

| | | | |
|---|---|---|---|
| $R_1 = 1.830$ | $R_2 = -1.518$ | $D = 1.68$ | $n_0 = 1.65$ |
| $g = 0.500$ | $h_4 = 0.530$ | $h_6 = 3.966$ | $f = 1.0$ |
| $NA = 0.5$ | | | | where $R_1$ and $R_2$ respectively represent the radii of curvatures of the incident side surface and the exit side surface.

60. A graded refractive index single lens system according to claim 5 wherein said graded refractive index single lens system has the following numerical data:

| | | | |
|---|---|---|---|
| $R_1 = 2.195$ | $R_2 = -1.807$ | $D = 1.92$ | $n_0 = 1.65$ |
| $g = 0.542$ | $h_4 = 0.120$ | $h_6 = 0.561$ | $f = 1.0$ |
| $NA = 0.5$ | | | | where $R_1$ and $R_2$ respectively represent the radii of curvatures of the incident side surface and the exit side surface.

61. A graded refractive index single lens system according to claim 5 wherein said graded refractive index single lens system has the following numerical data:

| | | | |
|---|---|---|---|
| $R_1 = 1.332$ | $R_2 = -2.166$ | $D = 1.56$ | $n_0 = 1.8$ |
| $g = 0.375$ | $h_4 = 1.755$ | $h_6 = 26.713$ | $f = 1.0$ |
| $NA = 0.5$ | | | | where $R_1$ and $R_2$ respectively represent the radii of curvatures of the incident side surface and the exit side surface.

62. A graded refractive index single lens system according to claim 5 wherein said graded refractive index single lens system has the following numerical data:

| | | | |
|---|---|---|---|
| $R_1 = 1.657$ | $R_2 = -3.000$ | $D = 1.80$ | $n_0 = 1.8$ |
| $g = 0.458$ | $h_4 = -0.103$ | $h_6 = 1.743$ | $f = 1.0$ |
| $NA = 0.5$ | | | | where $R_1$ and $R_2$ respectively represent the radii of curvatures of the incident side surface and the exit side surface.

63. A graded refractive index single lens system according to claim 5 wherein said graded refractive index single lens system has the following numerical data:

| | | | |
|---|---|---|---|
| $R_1 = 1.355$ | $R_2 = 1.906$ | $D = 1.56$ | $n_0 = 1.5$ |
| $g = 0.667$ | $h_4 = -0.415$ | $h_6 = -0.316$ | $f = 1.0$ |
| $NA = 0.6$ | | | | where $R_1$ and $R_2$ respectively represent the radii of curvatures of the incident side surface and the exit side surface.

64. A graded refractive index single lens system according to claim 5 wherein said graded refractive index single lens system has the following numerical data:

| | | | |
|---|---|---|---|
| $R_1 = 1.500$ | $R_2 = -4.096$ | $D = 1.62$ | $n_0 = 1.5$ |
| $g = 0.625$ | $h_4 = -0.268$ | $h_6 = 0.024$ | $f = 1.0$ |
| $NA = 0.6$ | | | | where $R_1$ and $R_2$ respectively represent the radii of curvatures of the incident side surface and the exit side surface.

65. A graded refractive index single lens system according to claim 5 wherein said graded refractive index single lens system has the following numerical data:

| | | | |
|---|---|---|---|
| $R_1 = 1.303$ | $R_2 = -374.044$ | $D = 1.56$ | $n_0 = 1.65$ |
| $g = 0.542$ | $h_4 = -0.570$ | $h_6 = -0.430$ | $f = 1.0$ |
| $NA = 0.6$ | | | | where $R_1$ and $R_2$ respectively represent the radii of curvatures of the incident side surface and the exit side surface.

66. A graded refractive index single lens system according to claim 5 wherein said graded refractive index single lens system has the following numerical data:

| | | | |
|---|---|---|---|
| $R_1 = 1.771$ | $R_2 = -2.650$ | $D = 1.80$ | $n_0 = 1.65$ |
| $g = 0.542$ | $h_4 = -0.130$ | $h_6 = 0.446$ | $f = 1.0$ |
| $NA = 0.6$ | | | | where $R_1$ and $R_2$ respectively represent the radii of curvatures of the incident side surface and the exit side surface.

67. A graded refractive index single lens system according to claim 5 wherein said graded refractive index single lens system has the following numerical data:

| | | | |
|---|---|---|---|
| $R_1 = 1.389$ | $R_2 = 2.792$ | $D = 1.68$ | $n_0 = 1.8$ |
| $g = 0.500$ | $h_4 = -0.747$ | $h_6 = -1.277$ | $f = 1.0$ |
| $NA = 0.6$ | | | | where $R_1$ and $R_2$ respectively represent the radii of curvatures of the incident side surface and the exit side surface.

68. A graded refractive index single lens system according to claim 5 wherein said graded refractive index single lens system has the following numerical data:

| | | | |
|---|---|---|---|
| $R_1 = 1.322$ | $R_2 = -7.400$ | $D = 1.62$ | $n_0 = 1.8$ |
| $g = 0.438$ | $h_4 = -0.410$ | $h_6 = 1.969$ | $f = 1.0$ |
| $NA = 0.6$ | | | | where $R_1$ and $R_2$ respectively represent the radii of curvatures of the incident side surface and the exit side surface.

69. A graded refractive index single lens system according to claim 5 wherein said graded refractive index single lens system has the following numerical data:

| | | | |
|---|---|---|---|
| $R_1 = 1.289$ | $R_2 = 47.625$ | $D = 1.56$ | $n_0 = 1.65$ |
| $g = 0.542$ | $h_4 = -0.601$ | $h_6 = -0.530$ | $f = 1.0$ |
| $NA = 0.7$ | | | | where $R_1$ and $R_2$ respectively represent the radii of curvatures of the incident side surface and the exit side surface.

70. A graded refractive index single lens system according to claim 5 wherein said graded refractive index single lens system has the following numerical data:

| | | | |
|---|---|---|---|
| $R_1 = 1.233$ | $R_2 = 6.217$ | $D = 1.56$ | $n_0 = 1.8$ |
| $g = 0.458$ | $h_4 = -0.791$ | $h_6 = -0.991$ | $f = 1.0$ |
| $NA = 0.7$ | | | | where $R_1$ and $R_2$ respectively represent the radii of curvatures of the incident side surface and the exit side surface.

* * * * *